United States Patent
Mori et al.

(10) Patent No.: US 8,699,841 B2
(45) Date of Patent: Apr. 15, 2014

(54) PHOTOSENSITIVE RESIN COMPOSITION, OPTICAL WAVEGUIDE FILM, FILM FOR FORMING OPTICAL WAVEGUIDE, OPTICAL INTERCONNECT, OPTO-ELECTRIC HYBRID CIRCUIT BOARD, ELECTRONIC DEVICE, AND A METHOD OF MANUFACTURING AN OPTICAL WAVEGUIDE FILM

(75) Inventors: Tetsuya Mori, Kanagawa (JP); Keizo Takahama, Tochigi (JP)

(73) Assignee: Sumitomo Bakelite Co., Ltd., Tokyo (JP)

( * ) Notice: Subject to any disclaimer, the term of this patent is extended or adjusted under 35 U.S.C. 154(b) by 431 days.

(21) Appl. No.: 13/148,191

(22) PCT Filed: Feb. 9, 2010

(86) PCT No.: PCT/JP2010/000793
§ 371 (c)(1),
(2), (4) Date: Aug. 5, 2011

(87) PCT Pub. No.: WO2010/092801
PCT Pub. Date: Aug. 19, 2010

(65) Prior Publication Data
US 2011/0286713 A1    Nov. 24, 2011

(30) Foreign Application Priority Data
Feb. 16, 2009   (JP) .................... 2009-032115

(51) Int. Cl.
*G02B 6/00* (2006.01)
*G02B 6/10* (2006.01)
*G02B 6/12* (2006.01)
*G02B 6/26* (2006.01)
*B29D 11/00* (2006.01)
*G03F 7/00* (2006.01)
*G02B 6/138* (2006.01)

(52) U.S. Cl.
CPC *G02B 6/00* (2013.01); *G02B 6/138* (2013.01); *B29D 11/00* (2013.01)
USPC ............... 385/130; 385/141; 385/14; 385/39; 264/1.25; 264/1.27; 430/321; 430/270.1

(58) Field of Classification Search
CPC .... G02B 6/00; G03F 7/004; B29D 11/00663; G02B 6/10; G02B 6/24; G02B 6/138
USPC ............ 385/14, 15, 31, 39, 51–52, 129–132, 385/141–145; 264/1.24–1.27; 430/270.1, 430/286.1, 321
See application file for complete search history.

(56) References Cited

U.S. PATENT DOCUMENTS 7,072,565 B2 * 7/2006 Shelnut et al. ................ 385/143
7,820,356 B2   10/2010 Choki et al.

FOREIGN PATENT DOCUMENTS

| JP | 2006 323318 | 11/2006 |
| JP | 2006 330118 | 12/2006 |

(Continued)

OTHER PUBLICATIONS

U.S. Appl. No. 13/206,611, filed Aug. 10, 2011, Choki, et al.

(Continued)

*Primary Examiner* — Uyen Chau N Le
*Assistant Examiner* — Michael Mooney
(74) *Attorney, Agent, or Firm* — Oblon, Spivak, McClelland, Maier & Neustadt, L.L.P.

(57) ABSTRACT

A photosensitive resin composition which includes (A) a cyclic olefin; (B) at least either one of a monomer having a cyclic ether group and an oligomer having a cyclic ether group, having a refractive index different from that of the component (A); and (C) a photoacid generator, is provided.

16 Claims, 5 Drawing Sheets

(56) References Cited

FOREIGN PATENT DOCUMENTS

| JP | 2007 177073 | 7/2007 |
| JP | 2008 158308 | 7/2008 |
| JP | 2008 233362 | 10/2008 |
| JP | 2008 286919 | 11/2008 |
| WO | 91 01505 | 2/1991 |

OTHER PUBLICATIONS

International Search Report Issued May 18, 2010 in PCT/JP10/000793 filed Feb. 9, 2010.

* cited by examiner

PHOTOSENSITIVE RESIN COMPOSITION, OPTICAL WAVEGUIDE FILM, FILM FOR FORMING OPTICAL WAVEGUIDE, OPTICAL INTERCONNECT, OPTO-ELECTRIC HYBRID CIRCUIT BOARD, ELECTRONIC DEVICE, AND A METHOD OF MANUFACTURING AN OPTICAL WAVEGUIDE FILM

TECHNICAL FIELD

The present invention relates to a photosensitive resin composition, an optical waveguide film, a film for forming optical waveguide, an optical interconnect, an opto-electric hybrid circuit board, an electronic device, and a method of manufacturing an optical waveguide film.

BACKGROUND ART

In recent years, in the field of optical communication, flexible film-type optical waveguide (optical waveguide film) has been developed, in place of quartz-based optical waveguide.

For example, Patent Document 1 discloses a technique of forming the optical waveguide, by selectively irradiating a photo-curable film with light so as to polymerize the monomer.

RELATED DOCUMENTS

Patent Documents

Patent Document 1

International Patent WO91/01505, Pamphlet

Patent Document 2

Japanese Laid-Open Patent Publication No. 2008-158308

DISCLOSURE OF THE INVENTION

Recent demand for development of the optical waveguide film is to reduce propagation loss of light.

According to the present invention, there is provided a photosensitive resin composition which includes:
(A) a cyclic olefin resin;
(B) at least either one of a monomer having a cyclic ether group and an oligomer having a cyclic ether group, having a refractive index different from that of the component (A); and
(C) a photoacid generator.

According to the configuration of the present invention, upon irradiation of the photosensitive resin composition with light, an acid generates from the photoacid generator, and the component (B) is polymerized only in the irradiated area. Since the amount of the component (B) decreases in the irradiated area, so that the component (B) contained in the unirradiated area diffuses towards the irradiated area so as to cancel the concentration gradient produced between the irradiated area and the unirradiated area, and thereby difference in refractive index occurs between the irradiated area and the unirradiated area.

In addition, by heating after the irradiation, the component (B) vaporizes out from the unirradiated area. Difference in refractive index is thus produced between the irradiated area and the unirradiated area. In this way, light may reliably be confined, enough to suppress propagation loss of light.

In addition, by using the components (A) and (B), the present invention successfully suppresses the propagation loss of light.

The photosensitive resin composition herein is preferably intended to be used for an optical waveguide.

The cyclic ether group owned by the component (B) is preferably an oxetanyl group or an epoxy group.

By adopting the oxetanyl group or epoxy group as the cyclic ether group owned by the component (B), the monomer may be polymerized in a stable manner.

The component (A) is preferably a norbornene-based resin.

By using the norbornene-based resin as the component (A), transmissivity of light at a predetermined wavelength may reliably be increased, and thereby the propagation loss may reliably be reduced. In addition, by using the norbornene-based resin as the component (A), also heat resistance may be improved.

The component (B) preferably has a refractive index lower than that of the component (A), and the cyclic olefin resin (A) preferably has a cleavable pendant group which is eliminatable by an acid released from the photoacid generator (C), and makes the resultant resin (A) lowered in the refractive index by the elimination.

By using cyclic olefin resin, refractive index of the irradiated area may reliably be lowered as compared with that of the unirradiated area.

In addition, since the component (B) has a refractive index lower than that of the component (A), diffusion of the monomer in the unirradiated area into the irradiated area will consequently lower the refractive index of the irradiated area. Accordingly, difference in refractive index between the irradiated area and the unirradiated area may be ensured.

The cyclic olefin resin (A) may have, in side chain thereof, a cleavable pendant group which is eliminatable by an acid released from the photoacid generator (C), and the component (B) may contain a first monomer represented by formula (100) below:

[Chemical Formula 1]

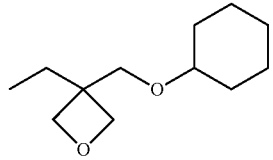

(100)

By using the monomer having a structure represented by the chemical formula (100), propagation loss may reliably be suppressed.

The component (B) may further contain at least either one of epoxy compound, and oxetane compound having two oxetanyl groups, as a second monomer, in addition to the monomer having the structure represented by the chemical formula (100).

This gives an effect of improving heat resistance of the photosensitive resin composition.

The cyclic olefin resin (A) is preferably a norbornene-based resin. The norbornene-based resin is preferably an addition polymer of norbornene, and preferably has a repeating unit represented by formula (101), or a repeating unit represented by formula (102) below. By adopting the configuration, the propagation loss may reliably be suppressed.

[Chemical Formula 2]

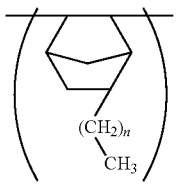
(101)

(in the formula (101), n represents an integer of 0 or larger, and 9 or smaller)

[Chemical Formula 3]

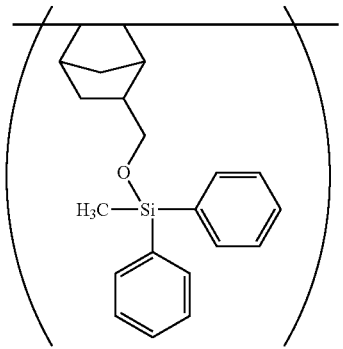
(102)

Content of the monomer represented by the formula (100) is preferably 1 part by weight or more, and 50 parts by weight or less, per 100 parts by weight of the cyclic olefin resin (A).

A sufficient amount of monomer to be diffused may be ensured by adjusting the content to 1 part by weight or more, and thereby a sufficient level of difference in refractive index may be ensured between the core and the clad. On the other hand, the content exceeding 50 parts by weight may makes it difficult to ensure a sufficient level of difference in refractive index between the core and the clad, even if the monomer should diffuse to some degree. The content adjusted in the above-described range may facilitate modulation of the refractive index.

The cleavable pendant group preferably has at least any one of —O— structure, —Si-aryl structure, and —O—Si— structure. Among others, the cleavable pendant group more preferably has —Si-diphenyl structure or —O—Si-diphenyl structure.

The cyclic olefin resin (A) preferably has the above-described cleavable pendant group, and has an epoxy group in addition to such cleavable pendant group.

Use of the cyclic olefin resin (A) having epoxy group will give an effect of elevating crosslinkage density of the optical waveguide film, based on an expected reaction with the component (B), and thereby improving the heat resistance.

The photosensitive resin composition described in the above may be used as a film for composing an optical waveguide.

Moreover, by using the photosensitive resin composition described in the above, it is also possible to provide an optical waveguide film manufactured by a method of manufacturing as described below.

More specifically, the optical waveguide film may be provided by:
selectively irradiating a photosensitive resin composition which includes:
(A) a cyclic olefin;
(B) at least either one of a monomer having a cyclic ether group and an oligomer having a cyclic ether group, having a refractive index different from that of the component (A); and
(C) a photoacid generator,
with light, followed by heating,
so as to make the irradiated area as either one of a cladding region and a core region, and the unirradiated area as the residual one of the cladding region and the core region.

According to the present invention, there is also provided an optical waveguide film having a layer composed of a cured product of:
(A) a cyclic olefin resin; and
(B) at least either one of a monomer having a cyclic ether group and an oligomer having a cyclic ether group, having a refractive index different from that of the component (A).

The layer has a core region, and a pair of cladding regions placed adjacent to the core region while placing it in between.

The core region has a refractive index larger than that of the cladding region.

The core region has a concentration of component (B)-derived structure different from a concentration of component (B)-derived structure in the cladding regions.

By making difference between the concentration of the component (B)-derived structure between the core region and the cladding regions, the difference in refractive index may be ensured between the core region and the cladding region, and thereby the optical waveguide film may be given a high level of optical confinement.

Use of the component (A) may also improve the transmissivity of light at a predetermined wavelength, and thereby suppress the propagation loss.

The difference in refractive index between the core region and the cladding regions is preferably 0.01 or larger.

Optical confinement may be ensured in this way.

The component (A) is more preferably a norbornene-based resin.

By using the norbornene-based resin as the component (A), the transmissivity of light at a predetermined wavelength may reliably be improved, and the propagation loss may reliably be reduced.

The cyclic ether group owned by the component (B) is preferably an oxetanyl group or an epoxy group. By adopting the component (B) having an oxetanyl group or an epoxy group as the cyclic ether group, the monomer and oligomer may be polymerized in a stable manner.

The optical waveguide film preferably has another pair of cladding regions placed while placing the core region in between, in a direction different from that of the above-described pair of cladding regions.

Such optical waveguide film may be manufactured by selectively irradiating a photosensitive resin composition which includes:
(A) a cyclic olefin;
(B) at least either one of a monomer having a cyclic ether group and an oligomer having a cyclic ether group, having a refractive index different from that of the component (A); and
(C) a photoacid generator,
with light, and
heating photosensitive resin composition,
so as to make the irradiated area as either one of a cladding region and a core region, and the unirradiated area as the residual one of the cladding region and the core region.

By using the above-described optical waveguide film, an optical interconnect may be formed.

Moreover, also an opto-electric hybrid circuit board having electric interconnects, and the above-described optical interconnect, may be provided.

Still also an electronic device having the above-described optical waveguide film may be provided.

According to the present invention, a photosensitive resin composition, an optical waveguide film, a film for forming optical waveguide, an optical interconnect, an opto-electric hybrid circuit board, and an electronic device capable of suppressing the propagation loss of light, and a method of manufacturing an optical waveguide film, may be provided.

BRIEF DESCRIPTION OF THE DRAWINGS

The above and other objects, features and advantages of the present invention will be more apparent from the following description of certain preferred embodiments taken in conjunction with the accompanying drawings below.

DESCRIPTION OF THE EMBODIMENTS

Figure 1:
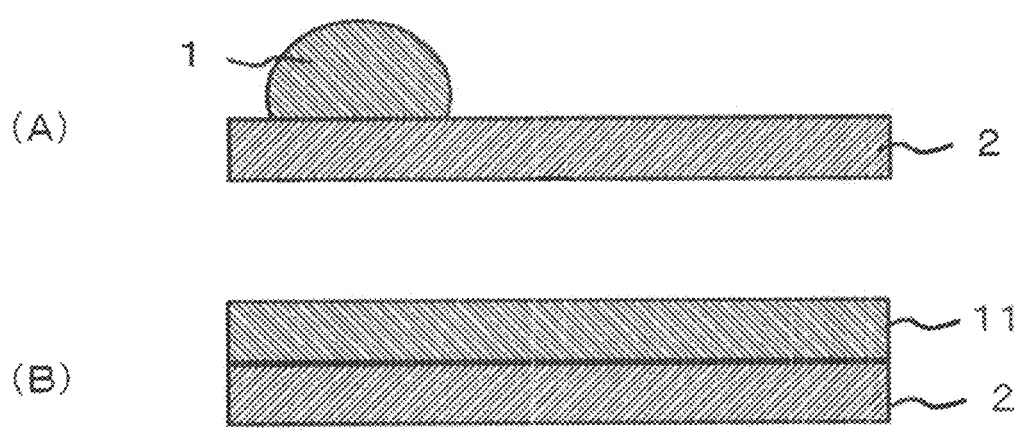
FIG. 1 is a drawing illustrating processes for manufacturing an optical waveguide film of the present invention.

Embodiments of the present invention will be explained below, referring to the attached drawings.
(Photosensitive Resin Composition)

First, the photosensitive resin composition will be explained.

The photosensitive resin composition of this embodiment has:

(A) a cyclic olefin resin;

(B) at least either one of a monomer having a cyclic ether group and an oligomer having a cyclic ether group, having a refractive index different from that of the component (A); and (C) a photoacid generator.

Among others, in view of thorough suppression of the propagation loss of light, the photosensitive resin composition preferably contains the cyclic olefin resin (A) having, in side chain thereof, cleavable pendant group which is eliminatable by an acid released from the photoacid generator (C), and a monomer represented by formula (100) below as the component (B):

[Chemical Formula 4]

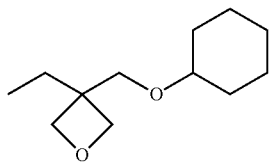

(100)

The photosensitive resin composition described in the above may be produced in the form of film for forming optical waveguide, and may be used for a film having regions different in the refractive index, such as an optical waveguide film.

By using this sort of photosensitive resin composition, the optical waveguide film successfully suppressed in the propagation loss of light may be provided. In particular, when the optical waveguide is formed into a curved geometry, the propagation loss of light may distinctively be suppressed.

In addition, an optical interconnect making use of the thus-configured optical waveguide film, and an opto-electric hybrid circuit board having the optical interconnect and an electric circuit, may be provided.

Still also an electronic device making use of the optical waveguide film may be provided.
((A) Cyclic Olefin Resin)

The cyclic olefin resin (A) is added for the purpose of ensuring a sufficient level of formability of film of the photosensitive resin composition, and configures a base polymer.

The cyclic olefin resin may be unsubstituted, or may be a product after substituting hydrogen atom(s) thereof with other group(s).

The cyclic olefin resin is typically a norbornene-based resin or a benzocyclobutene-based resin.

In particular, the norbornene-based resin may preferably be used in view of heat resistance and transparency.

The norbornene-based resin may be exemplified by:

(1) addition (co)polymer of norbornene-type monomer, obtained by addition (co)polymerization of the norbornene-type monomer;

(2) addition copolymer of norbornene-type monomer with ethylene or α-olefins;

(3) addition polymer such as addition copolymer of norbornene-type monomer with non-conjugated diene, and optionally with other monomer;

(4) ring-opened (co)polymer of norbornene-type monomer, and resin obtained by optional hydrogenation of the (co)polymer;

(5) ring-opened copolymer of norbornene-type monomer with ethylene or α-olefins, and resin obtained by optional hydrogenation of the (co)polymer; and (6) ring-opened copolymer obtained by norbornene-type monomer and non-conjugated diene, or other monomer, and ring-opened polymer obtained by optional hydrogenation of the (co)polymer. The polymer may be exemplified by random copolymer, block copolymer, and alternating copolymer.

The norbornene-based resins may be obtained by any of publicly known methods of polymerization which include combination of ring-opening metathesis polymerization (ROMP), combination of ROMP and hydrogenation, radical or cation polymerization, polymerization using cationic palladium-containing polymerization initiator, and polymerization using other polymerization initiator (for example, polymerization initiator containing nickel or other transition metal).

Among them, the addition (co)polymer is preferable as the norbornene-based resin. The addition (co)polymer is preferable also in view of excellence in the transparency, heat resistance and flexibility. For example, the film formed using the photosensitive resin composition may occasionally be mounted with electronic components while placing solder in between. The addition (co)polymer is preferable in this case, since an excellent level of heat resistance, or reflow resistance, is required. In another case, the film formed using the photosensitive resin composition may occasionally be used, while being incorporated into a product, in an environment at 80° C. or around. Also in this case, the addition (co)polymer may preferably be used, since the heat resistance is required.

In particular, the norbornene-based resin preferably contains a norbornene repeating unit having a polymerizable group-containing substituent, or preferably contains a norbornene repeating unit having an aryl group-containing substituent.

The norbornene repeating unit having a polymerizable group-containing substituent is preferably at least one of norbornene repeating unit having an epoxy group-containing substituent; norbornene repeating unit having a (meth)acryl group-containing substituent; and, norbornene repeating unit having an alkoxysilyl group-containing substituent. These polymerizable groups are particularly preferable among various polymerizable groups, by virtue of their high reactivity.

Use of the norbornene-based resin containing two or more species of norbornene repeating unit having such polymerizable group may achieve desirable levels of both of flexibility and heat resistance.

On the other hand, by virtue of presence of the norbornene repeating unit containing substituent having an aryl group which is extremely hydrophobic, dimensional changes due to moisture absorption or the like may be prevented in a more reliable manner.

The norbornene-based polymer more preferably contains an alkylnorbornene repeating unit. The alkyl group herein may have a straight chain form or branched form.

By virtue of presence of the alkylnorbornene repeating unit, the norbornene-based polymer may be improved in the flexibility, and thereby a high level of flexibility may be imparted.

The norbornene-based polymer containing the alkylnorbornene repeating unit is preferable also from the viewpoint of excellence in the transmissivity of light in a predetermined wavelength range (in particular at around 850 nm).

Considering the above, those represented by formulae (1) to (4), and (8) to (10) below are preferable as the norbornene-based resin.

[Chemical Formula 5]

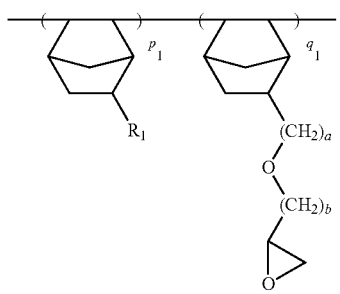

(1)

(In the formula (1), $R_1$ represents an alkyl group having carbon number 1 to 10, "a" represents an integer of 0 to 3, "b" represents an integer of 1 to 3, and $p_1/q_1$ is 20 or smaller.)

The norbornene-based resin represented by the formula (1) may be prepared as described below.

A norbornene having $R_1$ and a norbornene having an epoxy group in the side chain thereof are dissolved into toluene, and then allowed to polymerize in a solvent using a Ni compound (A) as a catalyst, so as to obtain the resin (1).

[Chemical Formula 6]

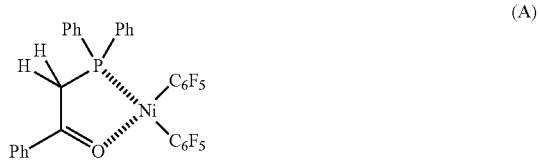

(A)

An exemplary method of preparing the norbornene having an epoxy group in the side chain thereof may be as described in (i) and (ii) below.

(i) Synthesis of Norbornene Methanol (NB—$CH_2$—OH)

CPD (cyclopentadiene) produced by cracking of DCPD (dicyclopentadiene) is allowed to react with α-olefin ($CH_2$=CH—$CH_2$—OH) under a high-temperature, high-pressure environment.

[Chemical Formula 7]

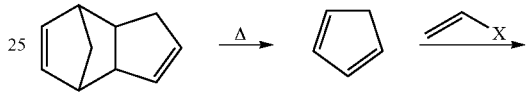

$X = CH_2OH$ (ii) Synthesis of Epoxy Norbornene

Epoxy norbornene is synthesized by reaction between norbornene methanol and epichlorohydrin.

[Chemical Formula 8]

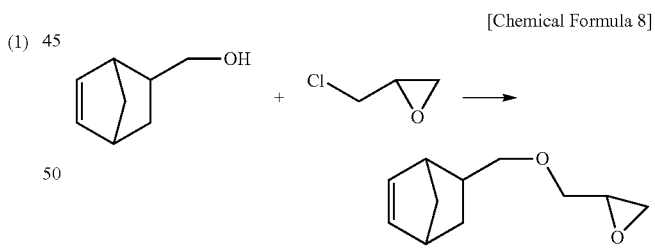

If b is 2 or 3 in the formula (1), a compound analogous to epichlorohydrin but having an ethylene group or propylene group in place of a methylene group may be used.

Among the norbornene-based resins represented by the formula (1), those having an alkyl group having carbon number 4 to 10 for $R_1$, and each of "a" and "b" representing 1, such as copolymer of butylbornene and methyl glycidyl ether norbornene, copolymer of hexyl norbornene and methyl glycidyl ether norbornene, and copolymer of decylnorbornene and methyl glycidyl ether norbornene, are preferable from the viewpoint of achieving desirable levels flexibility and heat resistance at the same time.

[Chemical Formula 9]

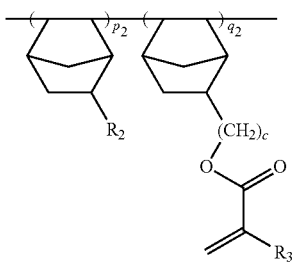
(2)

(In the formula (2), $R_2$ represents an alkyl group having carbon number 1 to 10, $R_3$ represents a hydrogen atom or methyl group, c represents an integer of 0 to 3, and $p_2/q_2$ is 20 or smaller.)

The norbornene-based resin represented by the formula (2) may be obtained by dissolving the norbornene having $R_2$, and the norbornene having an acryl or methacryl group in the side chain thereof into toluene, and by allowing them to react in solution using the above-described Ni compound (A) as a catalyst.

Among the norbornene-based polymers represented by the formula (2), those having an alkyl group having carbon number 4 to 10 for $R_2$, and "c" representing 1, such as copolymer of butylnorbornene and 2-(5-norbornenyl)methyl acrylate, copolymer of hexylnorbornene and 2-(5-norbornenyl)methyl acrylate, and copolymer of decylnorbornene and 2-(5-norbornenyl)methyl acrylate, are preferable from the viewpoint of achieving desirable levels of flexibility and heat resistance at the same time.

[Chemical Formula 10]

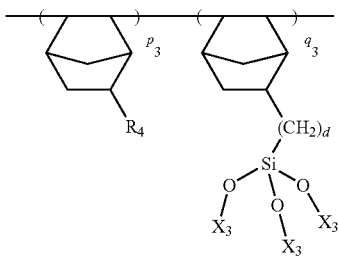
(3)

(In the formula (3), $R_4$ represents an alkyl group having carbon number 1 to 10, each $X_3$ independently represents an alkyl group having carbon number 1 to 3, d represents an integer of 0 to 3, and $p_3/q_3$ is 20 or smaller.)

The resin represented by the formula (3) may be obtained by dissolving a norbornene having $R_4$, and a norbornene having an alkoxysilyl group in the side chain thereof into toluene, and by allowing them to react in solution using the above-described Ni compound (A) as a catalyst.

Among the norbornene-based polymers represented by the formula (3), those having an alkyl group having carbon number 4 to 10 for $R_4$, d representing 1 or 2, and $X_3$ representing a methyl group or ethyl group, such as copolymer of butylnorbornene and norbornenyl ethyl trimethoxysilane, copolymer of hexylnorbornene and norbornenyl ethyl trimethoxysilane, copolymer of decylnorbornene and norbornenyl ethyl trimethoxysilane, copolymer of butylnorbornene and triethoxysilylnorbornene, copolymer of hexylnorbornene and triethoxysilylnorbornene, copolymer of decylnorbornene and triethoxysilylnorbornene, copolymer of butylnorbornene and trimethoxysilylnorbornene, copolymer of hexylnorbornene and trimethoxysilylnorbornene, and copolymer of decylnorbornene and trimethoxysilylnorbornene, are preferable.

[Chemical Formula 11]

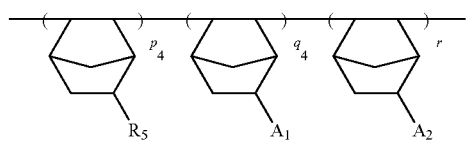
(4)

(In the formula, $R_5$ represents an alkyl group having carbon number 1 to 10, each of $A_1$ and $A_2$ independently represents a substituent represented by the formulae (5) to (7) below, excluding the case where both of which having the same substituent, and $p_4/q_4+r$ is 20 or smaller.)

The resin (4) is obtained by dissolving a norbornene having $R_5$, and norbornenes respectively having $A_1$ and $A_2$ in the side chains thereof into toluene, and by allowing them to react in solution using the above-described Ni compound (A) as a catalyst.

[Chemical Formula 12]

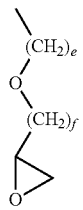
(5)

(In the formula (5), e represents an integer of 0 to 3, and f represents an integer of 1 to 3.)

[Chemical Formula 13]

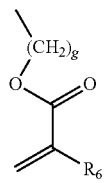
(6)

(In the formula (6), $R_6$ represents a hydrogen atom or methyl group, and g represents an integer of 0 to 3.)

[Chemical Formula 14]

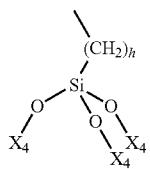
(7)

(In the formula (7), each $X_4$ independently represents an alkyl group having carbon number 1 to 3, and h represents an integer of 0 to 3.)

The norbornene-based polymers represented by the formula (4) may be exemplified by terpolymers obtained by reacting any one of butylnorbornene, hexylnorbornene and decylnorbornene, with 2-(5-norbornenyl)methyl acrylate, and with any one of norbornenyl ethyl trimethoxysilane, triethoxysilylnorbornene and trimethoxysilylnorbornene; terpolymers obtained by reacting anyone of butylnorbornene, hexylnorbornene and decylnorbornene, with 2-(5-norbornenyl)methyl acrylate, and with methyl glycidyl ether norbornene; and terpolymers obtained by reacting any one of butylnorbornene, hexylnorbornene and decylnorbornene, with methyl glycidyl ether norbornene, and with any one of norbornenyl ethyl trimethoxysilane, triethoxysilylnorbornene and trimethoxysilylnorbornene.

[Chemical Formula 15]

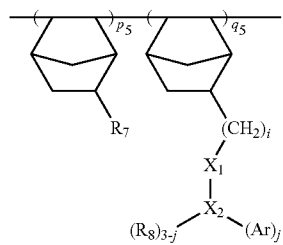

(8)

(in the formula (8), $R_7$ represents an alkyl group having carbon number 1 to 10, $R_8$ represents a hydrogen atom, methyl group or ethyl group, Ar represents an aryl group, $X_1$ represents an oxygen atom or methylene group, $X_2$ represents a carbon atom or silicon atom, i represents an integer of 0 to 3, j represents an integer of 1 to 3, and $p_5/q_5$ is 20 or smaller.)

The resin (8) is obtained by dissolving a norbornene having $R_7$, and a norbornene having —$(CH_2)_i$—$X_1$—$X_2(R_8)_{3-j}(Ar)_j$ in the side chain thereof into toluene, and by allowing them to react in solution using the above-described Ni compound (A) as a catalyst.

Among the norbornene-based polymers represented by the formula (8), those having an oxygen atom for $X_1$, a silicon atom for $X_2$, and a phenyl group for Ar are preferable.

Moreover, from the viewpoint of controllability of the flexibility, heat resistance and refractive index, those having an alkyl group having carbon number 4 to 10 for $R_7$, an oxygen atom for $X_1$, a silicon atom for $X_2$, a phenyl group for Ar, a methyl group for $R_8$, i representing 1, and j representing 2, such as copolymer of butylnorbornene and diphenylmethylnorbornene methoxysilane, copolymer of hexylnorbornene and diphenylmethylnorbornene methoxysilane, and copolymer of decylnorbornene and diphenylmethylnorbornene methoxysilane, are preferable.

More specifically, the norbornene-based resins shown below may preferably be used.

[Chemical Formula 16]

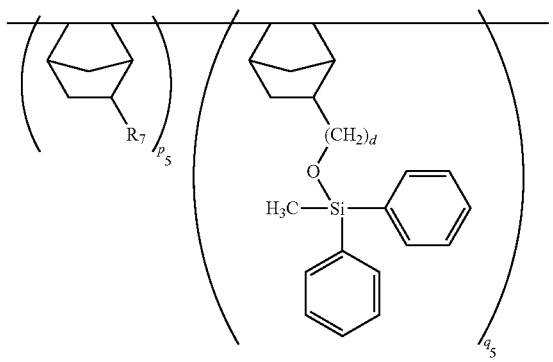

(9)

(All of $R_7$, $R_8$, $p_5$, $q_5$ and i in the formula (9) are same as those in the formula (8).)

From the viewpoint of controllability of the flexibility, heat resistance and refractive index, those having, in the formula (8), an alkyl group having carbon number 4 to 10 for $R_7$, a methylene group for $X_1$, a carbon atom for $X_2$, a phenyl group for Ar, a hydrogen atom for $R_8$, i representing 0, and j representing 1, such as copolymer of butylnorbornene and phenylethylnorbornene, copolymer of hexylnorbornene and phenylethylnorbornene, and copolymer of decylnorbornene and phenylethylnorbornene, are preferable.

Still alternatively, also the compounds shown below may be adoptable as the norbornene-based resin.

[Chemical Formula 17]

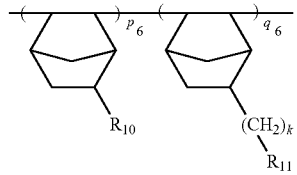

(10)

(in the formula (10), $R_{10}$ represents an alkyl group having carbon number 1 to 10, $R_{11}$ represents an aryl group, and k represents an integer of 0 or larger and 4 or smaller. $p_6/q_6$ is 20 or smaller.)

Each of $p_1/q_1$ to $p_3/q_3$, $p_5/q_5$, $p_6/q_6$ and $p_4/q_4+r$ may be 20 or smaller, preferably 15 or smaller, and more preferably 0.1 to 10 or around. By the adjustment, an effect of presence of a plurality of species of norbornene repeating unit may fully be expressed.

The norbornene-based resin as described in the above preferably has a cleavable pendant group. The cleavable pendant group herein means a group eliminated by an acid.

More specifically, the cleavable pendant group has at least any one of —O— structure, —Si-aryl structure and —O—Si— structure in the molecular structure thereof. The cleavable pendant group eliminatable with the aid of acid may be eliminatable by an action of cation, in a relatively easy manner.

The cleavable pendant group, capable of lowering the refractive index of the resin as a result of elimination, preferably has at least either one of —Si-diphenyl structure and —O—Si-diphenyl structure.

For example, among the norbornene-based polymers represented by the formula (8), those having an oxygen atom for $X_1$, a silicon atom for $X_2$, and a phenyl group for Ar may be those having the cleavable pendant groups.

[Chemical Formula 19]

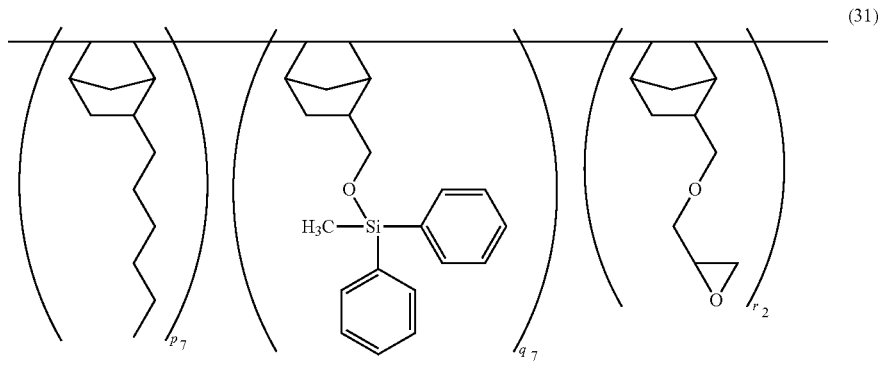

(31)

For the case of formula (3), elimination may occur in the alkoxysilyl group represented by Si—O—$X_3$.

For an exemplary case where the norbornene-based resin represented by the formula (9) is used, a reaction below will be supposed to proceed with the aid of an acid generated from a photoacid generator (abbreviated as PAG). Note that the scheme below shows only a portion around the cleavable pendant group with i=1.

[Chemical Formula 18]

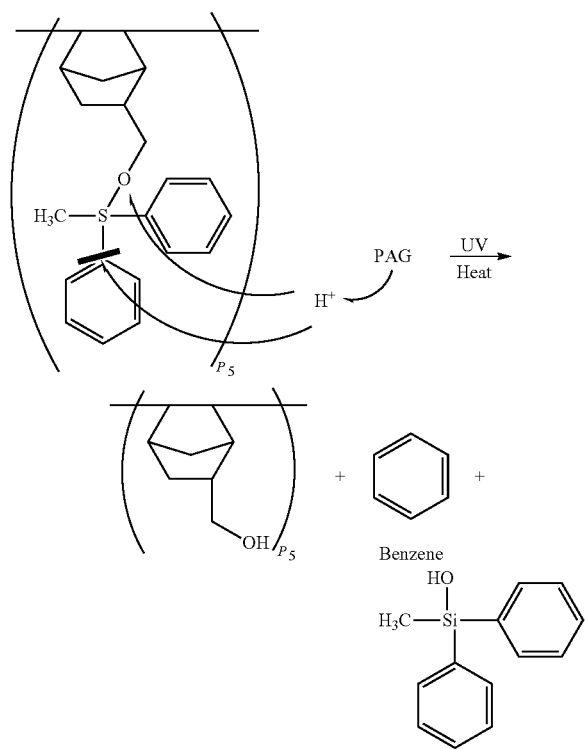

In addition to the structure represented by the formula (9), the norbornene-based resin may have an epoxy group in the side chain thereof. Use of such norbornene-based resin gives an effect of forming a film excellent in adhesiveness.

Specific examples of the norbornene-based resin may be given below.

(In the formula (31), $p_7/q_7+r_2$ is 20 or smaller.)

The compound represented by the formula (31) may be obtained by dissolving hexylnorbornene, diphenylmethylnorbornene methoxysilane (norbornene having —$CH_2$—O—$Si(CH_3)(Ph)_2$ in the side chain thereof), and epoxynorbornene into toluene, and allowing them to react in solution using the above-described Ni compound (A) as a catalyst.

((B) Monomer Having Cyclic Ether Group, and Oligomer Having Cyclic Ether Group)

Next, the component (B) will be explained.

The component (B) is at least either one of a monomer having a cyclic ether group, and an oligomer having a cyclic ether group. The component (B) may be good enough if it has a refractive index different from that of the resin (A), and if it is compatible with the resin (A). The difference in refractive indices between the component (B) and the resin (A) is preferably 0.01 or larger.

While the refractive index of the component (B) may be larger than that of the resin (A), the component (B) preferably has a refractive index smaller than that of the resin (A).

The component (B), which is a monomer having a cyclic ether group, or an oligomer having a cyclic ether group, is a species capable of polymerizing in a ring-opening manner in the presence of acid. Considering diffusability of the monomer and oligomer, both of the monomer and the oligomer preferably have molecular weights (weight-average molecular weights) of 100 or larger and 400 or smaller.

The component (B) typically has an oxetanyl group or an epoxy group. These cyclic ether groups are easy enough to cause ring opening, and are therefore preferable.

The monomer having an oxetanyl group, and the oligomer having an oxetanyl group are preferably the compounds selected from the those represented by formulae (11) to (20) below. By using these compounds, the optical waveguide film may have excellent transparency at around 850 nm, and may achieve desirable levels of flexibility and heat resistance at the same time. They may be used independently, or may be used in a mixed manner.

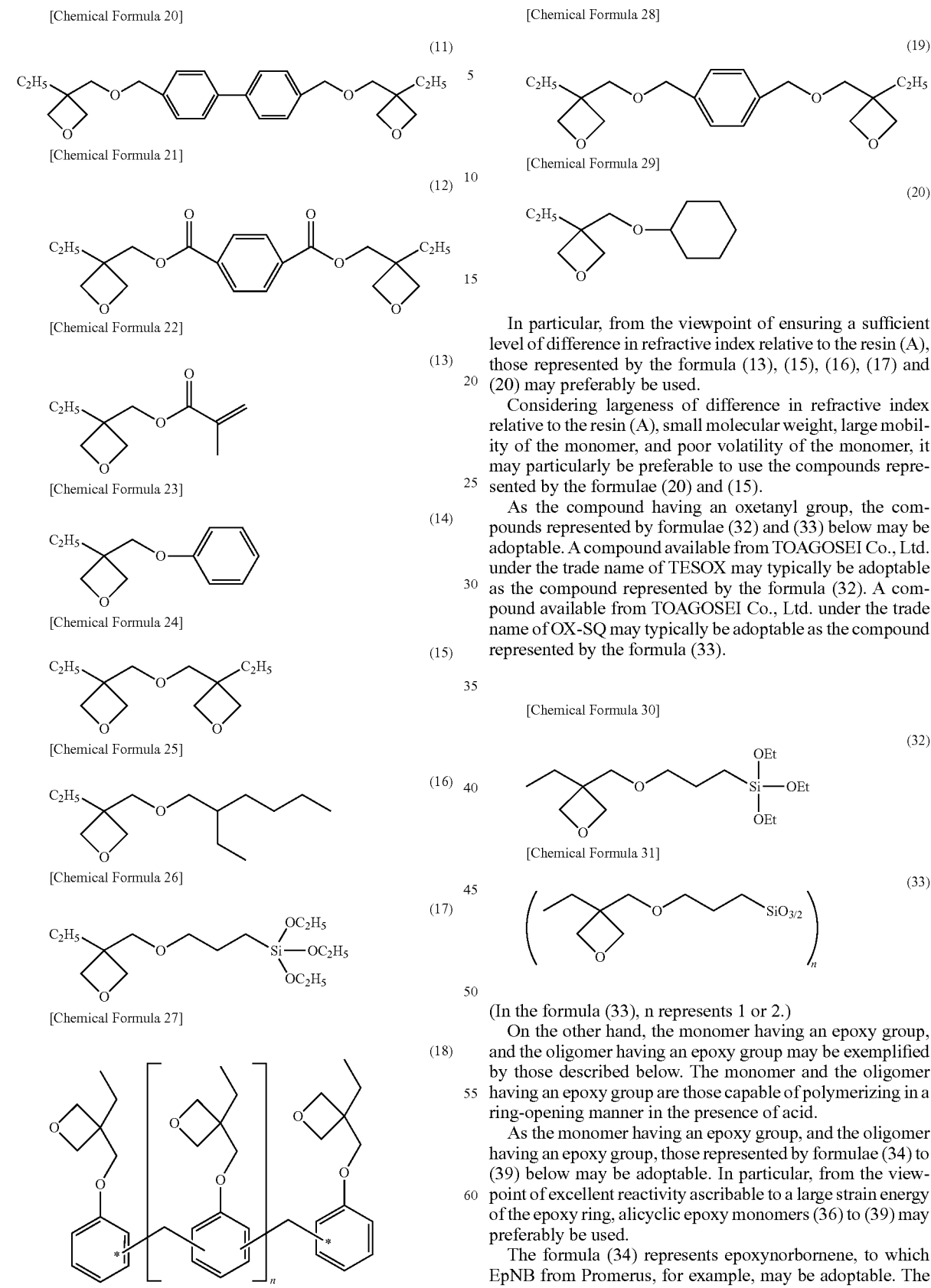

In the formula (18), n is 0 or larger, and 3 or smaller.

In particular, from the viewpoint of ensuring a sufficient level of difference in refractive index relative to the resin (A), those represented by the formula (13), (15), (16), (17) and (20) may preferably be used.

Considering largeness of difference in refractive index relative to the resin (A), small molecular weight, large mobility of the monomer, and poor volatility of the monomer, it may particularly be preferable to use the compounds represented by the formulae (20) and (15).

As the compound having an oxetanyl group, the compounds represented by formulae (32) and (33) below may be adoptable. A compound available from TOAGOSEI Co., Ltd. under the trade name of TESOX may typically be adoptable as the compound represented by the formula (32). A compound available from TOAGOSEI Co., Ltd. under the trade name of OX-SQ may typically be adoptable as the compound represented by the formula (33).

[Chemical Formula 30]

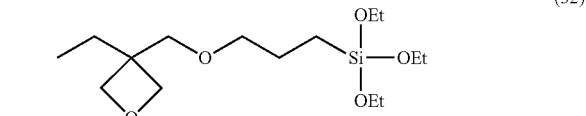

(32)

[Chemical Formula 31]

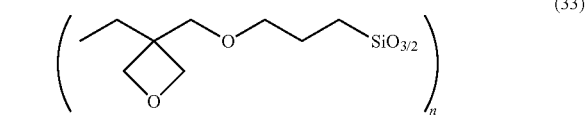

(33)

(In the formula (33), n represents 1 or 2.)

On the other hand, the monomer having an epoxy group, and the oligomer having an epoxy group may be exemplified by those described below. The monomer and the oligomer having an epoxy group are those capable of polymerizing in a ring-opening manner in the presence of acid.

As the monomer having an epoxy group, and the oligomer having an epoxy group, those represented by formulae (34) to (39) below may be adoptable. In particular, from the viewpoint of excellent reactivity ascribable to a large strain energy of the epoxy ring, alicyclic epoxy monomers (36) to (39) may preferably be used.

The formula (34) represents epoxynorbornene, to which EpNB from Promerus, for example, may be adoptable. The formula (35) represents γ-glycidoxypropyltrimethoxysilane, to which Z-6040 from Dow Corning Toray Co., Ltd., for example, may be adoptable. The formula (36) represents 2-(3, 4-epoxycyclohexyl) ethyltrimethoxysilane, to which E0327 from Tokyo Chemical Industry Co., Ltd., for example, may be adoptable.

The formula (37) represents 3,4-epoxycyclohexenylmethyl-3',4'-epoxycyclohexene carboxylate, to which Celloxide 2021P from Daicel Chemical Industries, Ltd., for example, may be adoptable. The formula (38) represents 1,2-epoxy-4-vinylcyclohexane, to which Celloxide 2000 from Daicel Chemical Industries, Ltd., for example, may be adoptable.

The formula (39) represents 1,2:8,9-diepoxylimonene, to which Celloxide 3000 from Daicel Chemical Industries, Ltd., for example, may be adoptable.

[Chemical Formula 32]

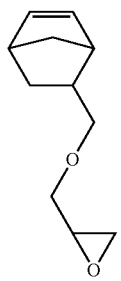

(34)

[Chemical Formula 33]

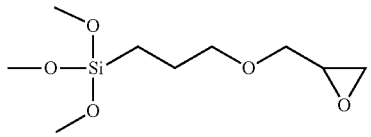

(35)

[Chemical Formula 34]

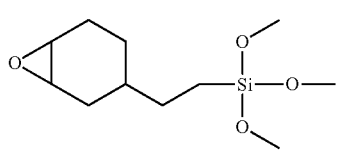

(36)

[Chemical Formula 35]

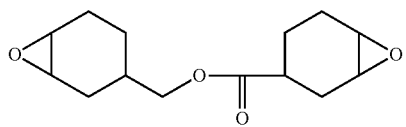

(37)

[Chemical Formula 36]

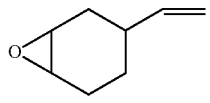

(38)

[Chemical Formula 37]

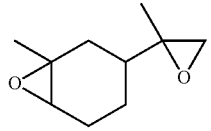

(39)

In addition, as the component (B), the monomer having an oxetanyl group, the oligomer having an oxetanyl group, a monomer having an epoxy group, and an oligomer having an epoxy group may be used in combination.

The monomer having an oxetanyl group, and the oligomer having an oxetanyl group can only slowly start the initiation reaction of polymerization, but can rapidly proceed the growth reaction. In contrast, the monomer having an epoxy group, and the oligomer having an epoxy group can quickly start the initiation reaction of polymerization, but can only slowly proceed the growth reaction. Accordingly, by using the monomer having an oxetanyl group and the oligomer having an oxetanyl group, together with the monomer having an epoxy group and the oligomer having an epoxy group, difference in refractive index between the irradiated area and the unirradiated area, upon irradiation of light, may be ensured.

The amount of the component (B) is preferably 1 part by weight or more, and 50 parts by weight or less per 100 parts by weight of the component (A), and more preferably 2 parts by weight or more, and 20 parts by weight or less. By virtue of the adjustment, the refractive indices of the core and clad may be modulated, and thereby both of the flexibility and heat resistance may be ensured at desirable levels.

((C) Photoacid Generator)

The photoacid generator may be good enough if it can produce Brønsted acid or Lewis acid upon absorption of energy of light, and may be exemplified by sulfonium salts such as triphenylsulfonium trifluoromethane sulfonate, and tris(4-t-butylphenyl)sulfonium trifluoromethanesulfonate; diazonium salts such as p-nitrophenyldiazonium hexafluorophosphate; ammonium salts; phosphonium salts; iodonium salts such as diphenyliodonium trifluoromethane sulfonate, and (tricumyl)iodonium-tetrakis(pentafluorophenyl)borate; quinone diazides; diazomethanes such as bis(phenylsulfonyl) diazomethane; sulfonate esters such as 1-phenyl-1-(4-methylphenyl)sulfonyloxy-1-benzoylmethane, and N-hydroxynaphthylimide-trifluoromethane sulfonate; disulfones such as diphenyldisulfone; and triazines such as tris(2,4,6-trichloromethyl)-s-triazine, and 2-(3,4-methylenedioxyphenyl)-4,6-bis(trichloromethyl)-s-triazine. These photoacid generators may be used independently, or two or more species of which may be used in combination.

The amount of photoacid generator is preferably 0.01 parts by weight or more, and 0.3 parts by weight or less, per 100 parts by weight of the component (A), particularly preferably 0.02 parts by weight or more and 0.2 parts by weight or less. The adjustment gives an effect of improving the reactivity.

The photosensitive resin composition may contain additives such as sensitizer, in addition to the components (A), (B) and (C) below.

The sensitizer functions to increase the sensitivity of the photoacid generator with respect to light, so as to reduce time and energy required for activation (reaction or decomposition) of the photoacid generator, or functions to convert wavelength of active radiation into the suitable wavelength for the activation of the photoacid generator.

The sensitizer may appropriately be selected depending on sensitivity of the photoacid generator and wavelength of absorption peak, without special limitation, and may be exemplified by anthracenes such as 9,10-dibutoxyanthracene (CAS No. 76275-14-4), xanthones, anthraquinones, phenanthrenes, chrysenes, benzpyrenes, fluorathenes, rubrenes, pyrenes, indanthrenes, and thioxanthene-9-ones, all of which may independently be used, or in the form of mixture.

Specific examples of the sensitizer include 2-isopropyl-9H-thioxanthene-9-one, 4-isopropyl-9H-thioxanthene-9-one, 1-chloro-4-propoxythioxanthone, phenothiazine, and mixtures of these compounds.

Content of the sensitizer is preferably 0.01% by weight or more of the photosensitive resin composition, more preferably 0.5% by weight or more, and still more preferably 1% by weight or more. The upper limit value is preferably 5% by weight or less.

Among the photosensitive resin compositions listed above, those containing a cyclic olefin resin having cleavable pendant group in the side chain thereof as the component (A), a photoacid generator as the component (C), and the first monomer represented by the formula (100) below as the component (B), are preferable.

Particularly preferable examples of the photosensitive resin composition will be described below.

[Chemical Formula 38]

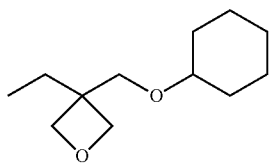

(100)

Materials adoptable to the cyclic olefin resin (A), which composes the cyclic olefin resin having the cleavable pendant group in the side chain thereof, may be above-described ones, and may be exemplified by polymers of monocyclic monomer such as cyclohexene, and cyclooctene; and polymers of polycyclic monomer such as norbornene, norbornadiene, dicyclopentadiene, dihydrodicyclopentadiene, tetracyclododecene, tricyclopentadiene, dihydrotricyclopentadiene, tetracyclopentadiene, and dihydrotetracyclopentadiene. Among them, one or more species of cyclic olefin resins selected from the polymers of polycyclic monomer may be preferable. By the selection, heat resistance of the resin may be improved.

Mode of polymerization may be any of publicly-known ones including random polymerization, block polymerization and so forth. Specific examples of polymerization of the norbornene-type monomer include (co)polymer of norbornene-type monomer, copolymer composed of norbornene-type monomer and other copolymerizable monomer such as α-olefins, and hydrogenated products of these copolymers. The cyclic olefin resins may be manufactured by publicly-known methods which include addition polymerization and ring-opening polymerization. Among those described in the above, cyclic olefin resins (in particular, norbornene-based resin) obtained by addition polymerization are preferable (addition polymer of norbornene-based compound). The photosensitive resin composition may now be improved in the transparency, heat resistance and flexibility.

The cleavable pendant group is eliminated after cleavage of a part of molecule by the aid of an acid ($H^+$) generated from the photoacid generator. More specifically, the cleavable pendant group preferably has, in the molecular structure (side chain) thereof, at least one of the above-described —O— structure, —Si-aryl structure and —O—Si— structure. The above-described cleavable pendant group causes elimination with the aid of the acid ($H^+$) in a relatively easy manner.

Among the above-described cleavable pendant groups, at least either one of the —Si-diphenyl structure and —O—Si-diphenyl structure is preferable as the cleavable pendant group capable of lowering the refractive index of the resin as a result of elimination.

While content of the cleavable pendant group is not specifically limited, it is preferably 10 to 80% by weight of the cyclic olefin resin having the cleavable pendant groups in the side chains thereof, and more preferably 20 to 60% by weight. By adjusting the content in the above-described ranges, the photosensitive resin composition may be made excellent both in the flexibility and modulability of refractive index (effect of expanding difference in refractive index).

The cyclic olefin resin having the cleavable pendant group in the side chain thereof, is preferably addition polymer of norbornene, and preferably those having a repeating unit represented by the formula (101) and/or formula (102) below. By the selection, the refractive index of the resin may be increased.

[Chemical Formula 39]

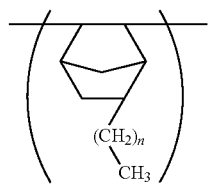

(101)

(in the formula 101, n represents an integer of 0 or larger, and 9 or smaller)

[Chemical Formula 40]

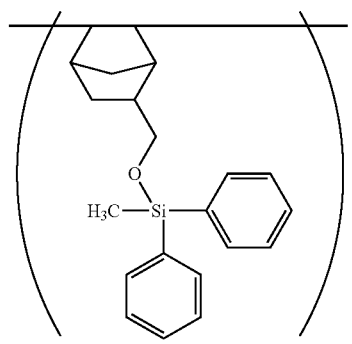

(102)

The photosensitive resin composition contains a monomer (referred to as a "first monomer", hereinafter) represented by the formula (100) in the above. By virtue of this configuration, the difference in refractive index between the adjacent core and clad may be expanded.

While content of the first monomer is not specifically limited, it is preferably 1 part by weight or more, and 50 parts by weight or less per 100 parts by weight of the cyclic olefin resin having the cleavable pendant group in the side chain thereof, more preferably 5 parts by weight or more, and 40 parts by weight or less, and particularly preferably 20 parts by weight or less. By virtue of the adjustment, the refractive indices of the core and clad may be modulated, and thereby both of the flexibility and heat resistance may be ensured at desirable levels.

The reason why the use of the first monomer combined with the cyclic olefin resin having the cleavable pendant group in the side chain thereof successfully improves a balance between the modulability of refractive indices of the core and clad, and flexibility, may be understood as described below.

Excellence of the modulability of refractive indices of the core and clad, as a result of using the above-described photosensitive resin composition, may be ascribable to excellence of reactivity of the first monomer which starts to polymerize with the aid of an acid generated upon irradiation of light. The first monomer therefore increases the curability thereof, and enhances the diffusability thereof while being driven by the concentration gradient of its own. Accordingly, the difference in refractive index between the irradiated area and the unirradiated area may be expanded.

Since the first monomer is a monofunctional compound, so that the photosensitive resin composition will not excessively be elevated in the crosslinkage density, in the progress of the polymerization reaction. The photosensitive resin composition is therefore excellent also in the flexibility.

While the photosensitive resin composition may contain a second monomer, different from the first monomer, although not specifically limited. The second monomer, different from the first monomer, may have a different structure, or a different molecular weight.

In particular, the second monomer may be contained as the component (B), and may be exemplified by epoxy compounds, oxetane compounds other than those represented by the formula (100), vinyl ether compounds and so forth. Among them, at least one species of the epoxy compounds (in particular, alicyclic epoxy compounds) and bifunctional oxetane compounds (monomers having two oxetanyl groups) is preferable. By the selection, reactivity between the first monomer and the cyclic olefin resin may be improved, and thereby the heat resistance of the waveguide may be improved while keeping the transparency at a desirable level.

The second monomer may specifically be exemplified by the compounds represented by the formula (15) in the above, the compounds represented by the formula (12) in the above, the compounds represented by the formula (11) in the above, the compounds represented by the formula (18) in the above, the compounds represented by the formula (19) in the above, and the compounds represented by the formulae (34) to (39) in the above.

While content of the second monomer is not specifically limited, it is preferably 1 part by weight or more, and 50 parts by weight or less per 100 parts by weight of the cyclic olefin resin, and particularly preferably 2 parts by weight or more, and 20 parts by weight or less. By the adjustment, the reactivity with the first monomer may be improved.

While also ratio of use of the second monomer and the first monomer is not specifically limited, ratio by weight of the second monomer and the first monomer (weight of second monomer/weight of first monomer) is preferably 0.1 to 1, and particularly preferably 0.1 to 0.6. By adjusting the ratio of use in the above-described ranges, the photosensitive resin composition may be well balanced between the reaction speed and the heat resistance of the waveguide.

While content of the photoacid generator is not specifically limited, it may preferably be 0.01 part by weight or more and 0.3 parts by weight or less, per 100 parts by weight of the cyclic olefin-based resin having the cleavable pendant group in the side chain thereof, and particularly preferably 0.02 parts by weight or more and 0.2 parts by weight or less. The content smaller than the lower limit value may degrade the reactivity, whereas the content exceeding the upper limit value may cause coloration of the waveguide so as to increase the loss of light.

The photosensitive resin composition may further contain a curing catalyst, antioxidant and so forth, besides the above-described cyclic olefin-based resin, the photoacid generator, the first monomer, and the second monomer.

The photosensitive resin composition of the present invention adopts the above-described photosensitive resin composition, in order to form the optical waveguide.

Paragraphs below will explain a method of manufacturing an optical waveguide film, using the above-described photosensitive resin composition.

The description herein will deal with the case where an optical waveguide film is manufactured using the photosensitive resin composition containing the component (B), the refractive index of which is smaller than that of the cyclic olefin resin (A).

First, as illustrated in FIG. 1(A), a photosensitive resin composition is dissolved into a solvent to configure a vanish 1, and the vanish 1 is then coated on a base 2.

The solvent for preparing the photosensitive resin composition in the form of vanish includes various organic solvents exemplified by ether-based solvents such as diethyl ether, diisopropyl ether, 1,2-dimethoxyethane (DME), 1,4-dioxane, tetrahydrofuran (THF), tetrahydropyran (THP), anisole, diethylene glycol dimethyl ether (diglyme), and diethylene glycol ethyl ether (carbitol); cellosolve-based solvents such as methyl cellosolve, ethyl cellosolve, and phenyl cellosolve; aliphatic hydrocarbon-based solvents such as hexane, pentane, heptane, and cyclohexane; aromatic hydrocarbon-based solvents such as toluene, xylene, benzene, and mesitylene; aromatic heterocyclic compound-based solvents such as pyridine, pyrazine, furan, pyrrole, thiophene, and methylpyrrolidone; amide-based solvents such as N,N-dimethylformamide (DMF), and N,N-dimethylacetamide (DMA); halogen compound-based solvents such as dichloromethane, chloroform, and 1,2-dichloroethane; ester-based solvents such as ethyl acetate, methyl acetate, and ethyl formate; and sulfur compound-based solvents such as dimethylsulfoxide (DMSO), and sulfolane; or mixed solvent containing these organic solvents.

Next, the vanish 1 coated on the base 2 is dried to thereby vaporize the solvent (solvent removal). After the process, as illustrated in FIG. 1(B), the vanish 1 is given as a film 11 for forming an optical waveguide.

Methods of coating the vanish 1 herein may be exemplified by doctor blade coating, spin coating, dipping, table coating, spraying, applicator coating, curtain coating and die coating, without being limited thereto. For the base 2, a sheet having a refractive index smaller than that of the later-described core region 112 is adoptable, which is exemplified by a sheet containing norbornene-based resin and epoxy resin.

Next, the film 11 is selectively irradiated with light (ultraviolet radiation, for example).

Figure 2:
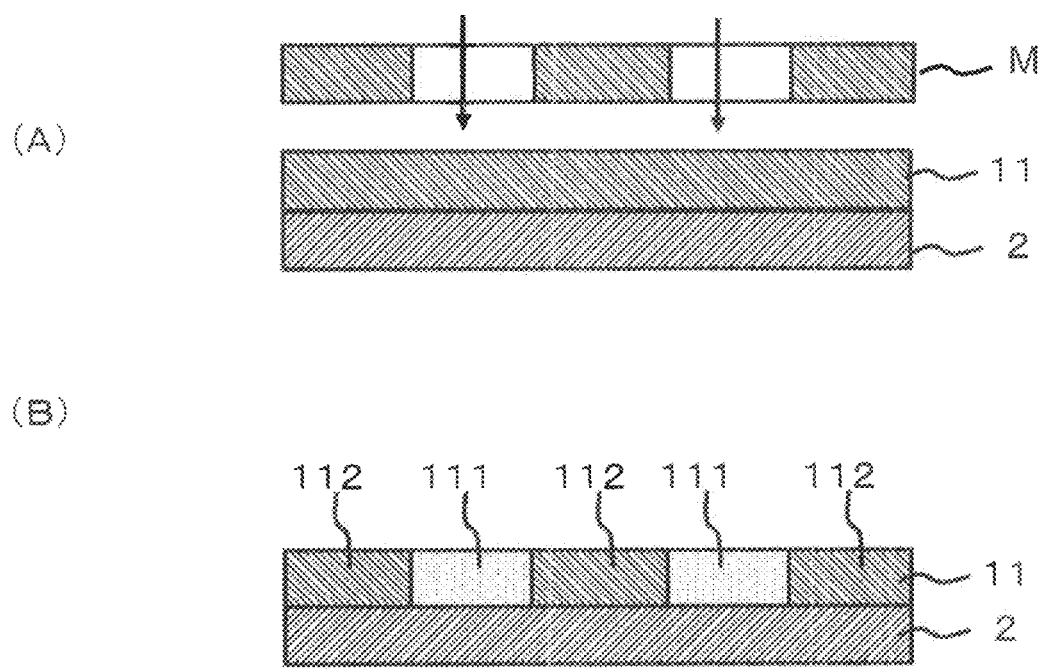
FIG. 2 is a drawing illustrating processes for manufacturing the optical waveguide film of the present invention.

As illustrated in FIG. 2(A), a mask M having openings formed therein is placed above the film 11. The film 11 is irradiated with light through the openings of the mask.

In the irradiated area of the film 11, an acid is released from the photoacid generator, and the component (B) polymerizes by the thus-produced acid.

In the unirradiated area, the photoacid generator does not produce the acid, so that the component (B) will not polymerize. In the irradiated area, the amount of component (B) decreases since the component (B) polymerizes to form a polymer. Accordingly, the component (B) contained in the unirradiated area diffuses towards the irradiated area, and thereby difference in refractive index occurs between the irradiated area and the unirradiated area.

If the component (B) has a refractive index smaller than that of the cyclic olefin resin, diffusion of the component (B) contained in the unirradiated area towards the irradiated area will elevate the refractive index of the unirradiated area, and will lower the refractive index of the irradiated area.

The polymer obtained by polymerization of the component (B) and the monomer having a cyclic ether group may be considered to have nearly the same refractive index, showing therebetween a difference of 0 or larger and 0.001 or smaller or around.

In addition, events below will take place by using the cyclic olefin resin having the cleavable pendant group, as the compound (A).

In the irradiated area, the cleavable pendant group of the cyclic olefin resin is eliminated by an acid released from the photoacid generator. As for the cleavable pendant group having a —Si-aryl structure, —Si-diphenyl structure, —O—Si-diphenyl structure or the like, the elimination consequently lowers the refractive index of the resin. Accordingly, the refractive index of the irradiated area will decrease.

As described in the above, by using the photosensitive resin composition of this embodiment, polymerization of the component (B) may be initiated with the aid of the acid released from the photoacid generator.

Next, the film 11 is heated. In the process of heating, the component (B) in the irradiated area will further polymerize. On the other hand, in the process of heating, the component (B) contained in the unirradiated area will vaporize. As a consequence, the amount of component (B) will decrease in the unirradiated area, to thereby give a refractive index close to that of the cyclic olefin resin.

In the film 11, as illustrated in FIG. 2(B), the irradiated area will serve as cladding regions 111, and the unirradiated area will serve as core regions 112. Refractive index of the core regions 112 is higher than refractive index of the cladding regions 111, which means difference between the concentration of the component (B)-derived structure in the core regions 112, and the concentration of the component (B)-derived structure in the cladding regions 111. More specifically, the concentration of the component (B)-derived structure in the core regions 112 is lower than the concentration of the component (B)-derived structure in the cladding regions.

The cladding regions 111 have a refractive index smaller than that of the core regions 112, ensuring a difference in refractive index between the cladding regions 111 and the core regions 112 of 0.01 or larger.

Thereafter, a film same as the base 2 is bonded over the film 11. The pair of bases 2 now serve as the cladding regions which are placed so as to hold the core region 112 in between, in the direction different from the cladding regions 111.

Figure 3:
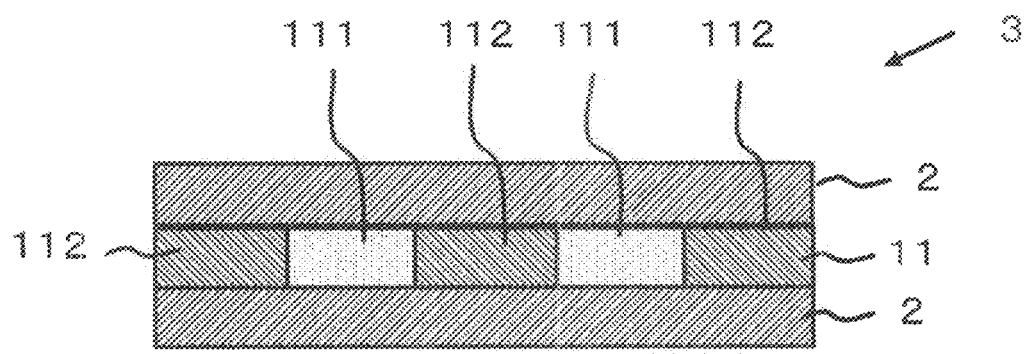
FIG. 3 is a sectional view illustrating an optical waveguide film of the present invention.

By the procedures described in the above, an optical waveguide film 3 will be obtained as illustrated in FIG. 3.

The optical waveguide film 3, obtained by using the photosensitive resin composition of the present invention, will be particularly excellent in resistance against solder reflow. In addition, the loss of light may be reduced even if the optical waveguide film 3 is bent.

Next, an optical interconnect, and an opto-electric hybrid circuit board will be briefed.

The optical interconnect of the present invention is configured by the above-described optical waveguide film 3. Since the process for manufacturing the waveguide no longer needs development, RIE (reactive ion etching) and so forth, so that the degree of freedom of processing may be improved.

Figure 5:
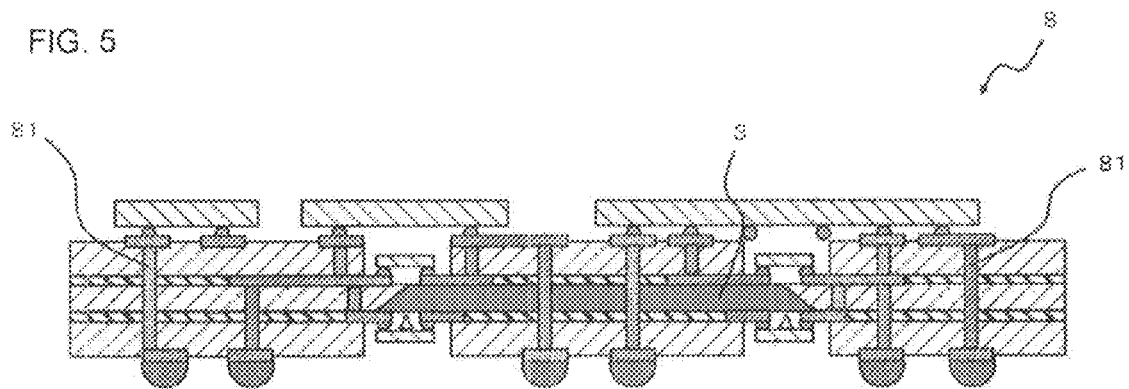
FIG. 5 is a drawing illustrating an optical interconnect and an opto-electric hybrid circuit board.

As illustrated in FIG. 5, the opto-electric hybrid circuit board 8 of the present invention has electric interconnects, and an optical interconnect configured by the above-described optical waveguide film 3. Electric interconnects 81 on the board are connected with each other via the optical interconnect. In this way, EMI (electromagnetic interference), having been problematic in the conventional electric interconnects, may be improved, and thereby signal transmission speed may distinctively be increased than before.

The electronic device of the present invention has the above-described optical waveguide film 3. This contributes to space saving.

This sort of electronic device may be exemplified by computer, server, mobile phone, game machine, memory tester, appearance inspection robot and so forth.

Next, operations and effects of this embodiment will be explained.

Upon irradiation of light onto the photosensitive resin composition of this embodiment, an acid generates from the photoacid generator, and thereby the component (B) polymerizes only in the irradiated area. Since the amount of component (B) in the irradiated area decreases, so that the component (B) contained in the unirradiated area diffuses towards the irradiated area, and thereby a difference in refractive index occurs between the irradiated area and the unirradiated area. More specifically, since the base polymer adopted in this embodiment is configured by the substituted or unsubstituted cyclic olefin resin having a refractive index higher than that of the component (B), so that the diffusion of the component (B) contained in the unirradiated area towards the irradiated area will make the refractive index of the unirradiated area higher than the refractive index of the irradiated area.

In addition, upon heating of the photosensitive resin composition after the irradiation, the component (B) vaporizes out from the unirradiated area. A further difference in refractive index then occurs between the irradiated area and the unirradiated area.

As described in the above, difference in refractive index may be ensured between the irradiated area and the unirradiated area, by using the photosensitive resin composition.

Note that Patent Document 2 discloses a technique of crosslinking a norbornene-based resin having oxetanyl groups or the like, with the aid of a thermal acid generator. The composition disclosed in Patent Document 2, however, contains the norbornene-based resin having oxetanyl groups or the like as the base polymer, and is configured to produce a crosslinked structure over the entire portion thereof under heating of the composition as a whole. Accordingly, Patent Document 2 has no technical idea regarding selective irradiation of light, consequent production of an acid and selective polymerization, and creation of concentration gradient based on diffusion of monomer towards the area having the monomer concentration decreased therein.

In contrast, the photosensitive resin composition of this embodiment is based on a finding that the selective irradiation of light decreases the amount of the component (B) contained in the irradiated area with the aid of the generated acid, allows the component (B) contained in the unirradiated area to diffuse into the irradiated area, and thereby the difference in refractive index occurs between the irradiated area and the unirradiated area.

The refractive index of the irradiated area may more reliably be reduced from that of the unirradiated area, by adopting the cyclic olefin resin having a cleavable pendant group which is eliminatable by an acid released from the photoacid generator, and makes the resultant cyclic olefin resin (A) lowered in the refractive index.

On the other hand, the refractive indices of the core region and the cladding region may be suppressed from fluctuating depending on conditions of irradiation of light, heating and so forth, by adopting the cyclic olefin resin having no cleavable pendant group, by virtue of improved chemical stability of the side chains.

As an additional feature, this embodiment adopts a norbornene-based resin as the component (A). This contributes to reliably increase the transmissivity of light at a predetermined wavelength, and decreases the propagation loss.

The cladding region 111 has a refractive index lower than that of the cladding region 111. By adjusting the difference in refractive index between the cladding region 111 and the core region 112 to 0.01 or larger, optical confinement may be ensured, and thereby the propagation loss of light may be suppressed.

The present invention is not limited to the above-described embodiments, so that all modifications and improvements are understood to fall within the scope of the present invention, so long as they can achieve the object of the present invention.

For example, the photosensitive resin composition, used for forming the optical waveguide film in the above-described embodiments, may alternatively be used for forming hologram film. The photosensitive resin composition of the present invention is suitable for forming a film having high-refractive-index areas and low-refractive-index areas hybridized therein.

The present invention is based on the inventions described below.

[1] A photosensitive resin composition which includes:
a cyclic olefin-based resin having a cleavable pendant group in side chain thereof;
an acid generator; and
a first monomer represented by the formula (100) below:

[Chemical Formula 41]

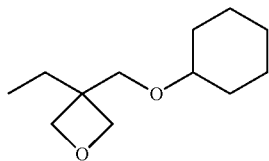

(100)

[2] The photosensitive resin composition described in [1], wherein content of the first monomer is 1 part by weight or more, and 50 parts by weight or less per 100 parts by weight of the cyclic olefin-based resin having the cleavable pendant group in the side chain thereof.

[3] The photosensitive resin composition described in [1] or [2], further containing a second monomer different from the first monomer.

[4] The photosensitive resin composition described in [3], wherein ratio by weight of the second monomer and the first monomer (weight of second monomer/weight of first monomer) is 0.1 to 1.0.

[5] The photosensitive resin composition described in [4], wherein the second monomer is at least either one of epoxy compound and bifunctional oxetane compound.

[6] The photosensitive resin composition described in any one of [1] to [5], wherein the cleavable pendant group has at least any one of —O— structure, —Si-aryl structure and —O—Si— structure.

[7] The photosensitive resin composition described in any one of [1] to [6], wherein the cyclic olefin-based resin is a norbornene-based resin.

[8] The photosensitive resin composition described in [7], wherein the norbornene-based resin is an addition polymer of norbornene.

[9] The photosensitive resin composition described in [8], wherein the addition polymer of norbornene has a repeating unit represented by the formula (101) below:

[Chemical Formula 42]

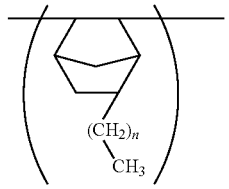

(101)

(n is 0 or larger, and 9 or smaller.)

[10] The photosensitive resin composition described in [8] or [9], wherein the addition polymer of norbornene has a repeating unit represented by the formula (102) below:

[Chemical Formula 43]

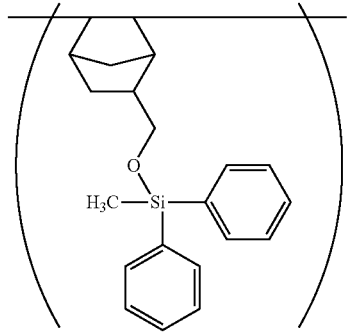

(102)

[11] A photosensitive resin for forming an optical waveguide, having the photosensitive resin composition described in any one of [1] to [10] used as a photosensitive resin composition for forming an optical waveguide.

[12] A film for forming an optical waveguide, configured by the photosensitive resin composition for forming an optical waveguide described in [11].

[13] An optical waveguide configured by the film for forming an optical waveguide described in [12], having core portions and cladding portions having different refractive indices provided thereto.

[14] An optical waveguide having cladding portions formed by irradiating light onto the film for forming an optical waveguide described in [12].

[15] An optical interconnect having the optical waveguide described in [13] or [14].

[16] An opto-electric hybrid circuit board having electric interconnects, and the optical interconnect described in [15].

[17] An electronic device having the optical waveguide described in [13] or [14].

This application claims priority right based on Japanese Patent Application No. 2009-032115 filed on Feb. 16, 2009, the entire content of which is incorporated hereinto by reference.

EXAMPLES

Next, the Examples of the present invention will be explained.

Example 1

(1) Synthesis of Norbornene-Based Resin Having Cleavable Pendant Groups

In a glove box conditioned to have both of moisture content and oxygen content suppressed to 1 ppm or smaller, and filled with dry nitrogen, 7.2 g (40.1 mmol) of hexylnorbornene (HxNB), and 12.9 g (40.1 mmol) of diphenylmethylnorbornene methoxysilane were weighed in a 500-mL vial, the mixture was added with 60 g of dehydrated toluene and 11 g of ethyl acetate, and the vial was tightly closed by placing a sealer made of silicone resin.

Next, 1.56 g (3.2 mmol) of a Ni catalyst represented by chemical formula (B) below and 10 mL of dehydrated toluene were weighed in a 100-mL vial, a stirrer chip was placed therein, the vial was tightly closed, and the mixture was thoroughly stirred so as to extensively dissolve the catalyst.

One milliliter of the solution of the Ni catalyst represented by the chemical formula (B) was precisely measured using a syringe, and quantitatively injected in the vial containing two species of the above-described norbornene dissolved therein, and the mixture was stirred for one hour at room temperature. A distinctive increase in the viscosity was confirmed. The sealer was then removed, 60 g of tetrahydrofuran (THF) was added, the mixture was stirred, and thereby a reaction solution was obtained.

In a 100-mL beaker, 9.5 g of acetic anhydride, 18 g (30% concentration) of aqueous hydrogen peroxide solution, and 30 g of ion-exchanged water were placed, and the mixture was stirred so as to prepare an aqueous peroxyacetic acid solution in situ. Next, the whole volume of the aqueous solution was added to the above-described reaction solution, and the mixture was stirred for 12 hours so as to reduce Ni.

Next, the thus-processed reaction solution was transferred into a separating funnel, the lower aqueous layer was discarded, 100 mL of a 30% aqueous solution of isopropanol was added, and the content was vigorously shaken. The content was allowed to stand still, and the aqueous layer was discarded after complete two-layer separation was confirmed. The above-described water washing process was repeated three times in total, and an oil layer was dropped into a largely excessive amount of acetone to thereby re-precipitate the resultant polymer, the polymer was separated by filtration from the filtrate, and then dried in a vacuum desiccator set to 60° C. for 12 hours, and thereby a polymer #1 was obtained. The polymer was found to have a molecular weight distribution characterized by Mw=100,000 and Mn=40,000 based on GPC measurement. Molar ratio of the individual structural units in the polymer #1 was identified by NMR, thereby hexylnorbornene structural unit was found to account for 50 mol %, and diphenylmethylnorbornene methoxysilane structural unit was found to account for 50 mol %. The refractive index, measured using a Metricon's instrument, was found to be 1.55 (measured at 633 nm).

[Chemical Formula 44]

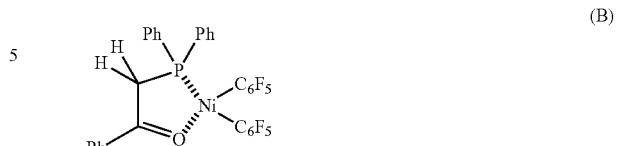

[Chemical Formula 45]

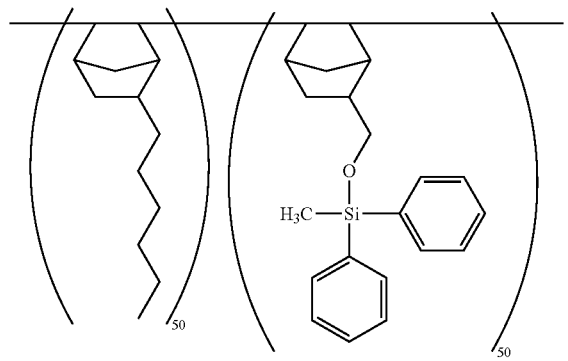

(2) Method of Preparing Photosensitive Resin Composition

Ten grams of the thus-purified polymer #1 was weighed in a 100-mL glass container, and 40 g of mesitylene, 0.01 g of an antioxidant (Irganox 1076 from Ciba-Geigy Ltd.), 2 g of cyclohexyloxetane monomer (the first monomer represented by the formula 20 (formula 100), CHOX from TOAGOSEI Co., Ltd., CAS#483303-25-9, MW=186, b.p.=125° C./1.33 kPa), and $1.36 \times 10^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2-μm PTFE filter, thereby a clean photosensitive resin composition vanish V1 was obtained.

(3) Method of Manufacturing an Optical Waveguide Film (Manufacturing of Lower Clad)

A photo-sensitive norbornene resin composition (Avatrel 2000P vanish, from Promerus) was uniformly coated on a silicon wafer using a doctor blade, and kept in a drying oven at 45° C. for 15 minutes. After the solvent was completely removed, the entire coated surface was irradiated with ultraviolet radiation at 100 mJ, heated in a drying oven at 120° C. for one hour so as to cure the coated film, and thereby a lower clad was formed. The thus-formed lower clad was found to be 20 μm thick, colorless and transparent, with a refractive index of 1.52 (measured at 633 nm).

(Formation of Core Regions and Cladding Regions)

The photosensitive resin composition vanish V1 was uniformly coated over the lower clad using a doctor blade, and kept in a drying oven at 45° C. for 15 minutes. After the solvent was completely removed, a photomask was pressed on the coated film, and the coated film was then selectively irradiated with ultraviolet radiation at 500 mJ/cm². The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

A dry film composed of a polyether sulfone (PES) film, preliminarily coated with a Avatrel 2000P so as to attain a dry thickness of 20 μm, was bonded to the core regions of the waveguide, the work was placed in a vacuum laminator set to 140° C. for heat bonding, irradiated overall with ultraviolet radiation at 100 mJ, and heated in a drying oven at 120° C. for one hour so as to cure Avatrel 2000P. Thereby an upper clad was formed, and an optical waveguide was obtained. The upper clad was found to be colorless and transparent, with a refractive index of 1.52.

(4) Evaluation (Evaluation of Loss of Optical Waveguide)

Light emitted from a 850-nm VCSEL (surface emitting laser) was introduced through a 50-μm-diameter optical fiber into the optical waveguide, and intensity of light received by a 200-μm-diameter optical fiber was measured. The cutback method is adopted to this measurement. When plotted with the length of waveguide on the abscissa and the insertion loss on the ordinate, the measured values were found to clearly fall on a straight line, and the slope thereof gave a propagation loss of 0.03 dB/cm.

(Difference in Refractive Index Between Core Region and Cladding Region)

Difference of the refractive index between every adjacent core region and cladding region horizontally aligned side by side (the core regions and cladding regions formed as described in "Formation of Core Regions and Cladding Regions" in the above) was calculated as described below.

Laser light of 656 nm, emitted from an optical waveguide analyzer OWA-9500 from EXFO, Canada, was irradiated onto the optical waveguide, and refractive indices of the core region and the cladding region were respectively measured. Difference of the refractive indices was calculated as 0.02.

Example 2

(1) Synthesis of Norbornene-Based Resin Having No Cleavable Pendant Group

In a glove box conditioned to have both of moisture content and oxygen content suppressed to 1 ppm or smaller, and filled with dry nitrogen, 9.4 g (53.1 mmol) of hexylnorbornene (HxNB), and 10.5 g (53.1 mmol) of phenylethylnorbornene were weighed in a 500-mL vial, the mixture was added with 60 g of dehydrated toluene and 11 g of ethyl acetate, and the vial was tightly closed by placing a sealer made of silicone resin.

Next, 2.06 g (3.2 mmol) of a Ni catalyst represented by chemical formula (B) in the above and 10 mL of dehydrated toluene were weighed in a 100-mL vial, a stirrer chip was placed therein, the vial was tightly closed, and the mixture was thoroughly stirred so as to extensively dissolve the catalyst.

One milliliter of the solution of the Ni catalyst represented by the chemical formula (B) was precisely measured using a syringe, and quantitatively injected in the vial containing two species of the above-described norbornene dissolved therein, and the mixture was stirred for one hour at room temperature. A distinctive increase in the viscosity was confirmed. The sealer was then removed, 60 g of tetrahydrofuran (THF) was added, the mixture was stirred, and thereby a reaction solution was obtained.

In a 100 mL beaker, 9.5 g of acetic anhydride, 18 g (30% concentration) of aqueous hydrogen peroxide solution, and 30 g of ion-exchanged water were placed, and the mixture was stirred so as to prepare an aqueous peroxyacetic acid solution in situ. Next, the whole volume of the aqueous solution was added to the above-described reaction solution, and the mixture was stirred for 12 hours so as to reduce Ni.

Next, the thus-processed reaction solution was transferred into a separating funnel, the lower aqueous layer was discarded, 100 mL of a 30% aqueous solution of isopropanol was added, and the content was vigorously shaken. The content was allowed to stand still, and the aqueous layer was discarded after complete two-layer separation was confirmed. The above-described water washing process was repeated three times in total, and an oil layer was dropped into a largely excessive amount of acetone to thereby re-precipitate the resultant polymer, the polymer was separated by filtration from the filtrate, and then dried in a vacuum desiccator set to 60° C. for 12 hours, and thereby a polymer #2 was obtained. The polymer was found to have a molecular weight distribution characterized by Mw=90,000 and Mn=40,000 based on GPC measurement. Molar ratio of the individual structural units in the polymer #2 was identified by NMR, thereby hexylnorbornene structural unit was found to account for 50 mol %, and phenylethylnorbornene structural unit was found to account for 50 mol %. The refractive index, measured using a Metricon's instrument, was found to be 1.54 (measured at 633 nm).

[Chemical Formula 46]

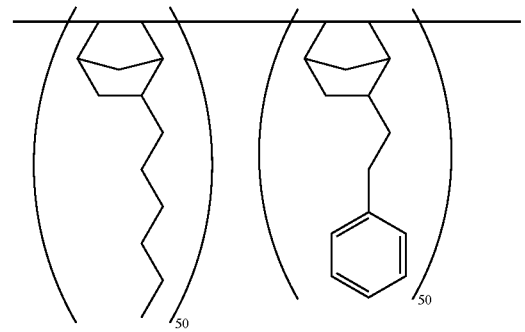

Polymer #2

(2) Method of Preparing Photosensitive Resin Composition

Ten grams of the thus-purified polymer #2 was weighed in a 100-mL glass container, and 40 g of mesitylene, 0.01 g of an antioxidant (Irganox 1076 from Ciba-Geigy Ltd.), 2 g of cyclohexyloxetane monomer (represented by the formula 20, CHOX from TOAGOSEI Co., Ltd., CAS#483303-25-9, MW=186, b.p.=125° C./1.33 kPa), and $1.36 \times 10^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2-μm PTFE filter, thereby a clean photosensitive resin composition vanish V2 was obtained.

(3) Method of Manufacturing Optical Waveguide Film (Manufacturing of Lower Clad)

The lower clad similar to that described in Example 1 was manufactured.

(Formation of Core Regions and Cladding Regions)

The photosensitive resin composition vanish V2 was uniformly coated over the lower clad using a doctor blade, and kept in a drying oven at 45° C. for 15 minutes. After the solvent was completely removed, a photomask was pressed on the coated film so as to closely contact therewith, and the coated film was then selectively irradiated with ultraviolet radiation at 500 mJ/cm$^2$. The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

The upper clad similar to that described in Example 1 was manufactured.

(4) Evaluation

Evaluation was carried out similarly as described in Example 1. The propagation loss was calculated as 0.04 dB/cm. Difference in refractive index between the core regions and the cladding regions was found to be 0.01.

Example 3

(1) Synthesis of Norbornene-Based Resin Having Cleavable Pendant Groups

The norbornene-based resin was synthesized similarly as described in Example 1.

(2) Method of Preparing Photosensitive Resin Composition

Ten grams of the thus-purified polymer #1 was weighed in a 100-mL glass container, and 40 g of mesitylene, 0.01 g of an antioxidant (Irganox 1076 from Ciba-Geigy Ltd.), 2 g of a bifunctional oxetane monomer (represented by the formula 15, DOX from TOAGOSEI Co., Ltd., CAS#18934-00-4, MW=214, b.p.=119° C./0.67 kPa), and 1.36×10$^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2 μm PTFE filter, thereby a clean photosensitive resin composition vanish V3 was obtained.

(3) Method of Manufacturing Optical Waveguide Film (Manufacturing of Lower Clad)

The lower clad similar to that described in Example 1 was manufactured.

(Formation of Core Regions and Cladding Regions)

The photosensitive resin composition vanish V3 was uniformly coated over the lower clad using a doctor blade, and kept in a drying oven at 45° C. for 15 minutes. After the solvent was completely removed, a photomask was pressed on the coated film, and the coated film was then selectively irradiated with ultraviolet radiation at 500 mJ/cm$^2$. The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

The upper clad similar to that described in Example 1 was manufactured.

(4) Evaluation

Evaluation was carried out similarly as described in Example 1. The propagation loss was calculated as 0.04 dB/cm. Difference in refractive index between the core regions and the cladding regions was found to be 0.01.

Example 4

(1) Synthesis of Norbornene-Based Resin Having Cleavable Pendant Groups

The norbornene-based resin was synthesized similarly as described in Example 1.

(2) Method of Preparing Photosensitive Resin Composition

Ten grams of the thus-purified polymer #1 was weighed in a 100-mL glass container, and 40 g of mesitylene, 0.01 g of an antioxidant (Irganox 1076 from Ciba-Geigy Ltd.), 2 g of a alicyclic epoxy monomer (represented by formula (37), Celloxide 2021P from Daicel Chemical Industries, Ltd., CAS#2386-87-0, MW=252, b.p.=188° C./4 hPa), and 1.36×10$^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2 μm PTFE filter, thereby a clean photosensitive resin composition vanish V4 was obtained.

(3) Method of Manufacturing Optical Waveguide Film (Manufacturing of Lower Clad)

The lower clad similar to that described in Example 1 was manufactured.

(Formation of Core Regions and Cladding Regions)

The photosensitive resin composition vanish V4 was uniformly coated over the lower clad using a doctor blade, and kept in a drying oven at 45° C. for 15 minutes. After the solvent was completely removed, a photomask was pressed on the coated film, and the coated film was then selectively irradiated with ultraviolet radiation at 500 mJ/cm$^2$. The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

The upper clad similar to that described in Example 1 was manufactured.

(4) Evaluation

Evaluation was carried out similarly as described in Example 1. The propagation loss was calculated as 0.04 dB/cm. Difference in refractive index between the core regions and the cladding regions was found to be 0.01.

Example 5

(1) Synthesis of Norbornene-Based Resin Having Cleavable Pendant Groups

The norbornene-based resin was synthesized similarly as described in Example 1.

(2) Method of Preparing Photosensitive Resin Composition

Ten grams of the thus-purified polymer #1 was weighed in a 100-mL glass container, and 40 g of mesitylene, 0.01 g of an antioxidant (Irganox 1076 from Ciba-Geigy Ltd.), 1 g of cyclohexyloxetane monomer (represented by formula 20, CHOX from TOAGOSEI Co., Ltd.), 1 g of an alicyclic epoxy monomer (Celloxide 2021P from Daicel Chemical Industries, Ltd.), and $1.36 \times 10^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2 µm PTFE filter, thereby a clean photosensitive resin composition vanish V5 was obtained.

(3) Method of Manufacturing Optical Waveguide Film (Manufacturing of Lower Clad)

The lower clad similar to that described in Example 1 was manufactured.

(Formation of Core Regions and Cladding Regions)

The photosensitive resin composition vanish V5 was uniformly coated over the lower clad using a doctor blade, and kept in a drying oven at 45° C. for 15 minutes. After the solvent was completely removed, a photomask was pressed on the coated film, and the coated film was then selectively irradiated with ultraviolet radiation at 500 mJ/cm². The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

The upper clad similar to that described in Example 1 was manufactured.

(4) Evaluation

Evaluation was carried out similarly as described in Example 1. The propagation loss was calculated as 0.03 dB/cm. Difference in refractive index between the core regions and the cladding regions was found to be 0.01.

Example 6

(1) Synthesis of Norbornene-Based Resin Having Cleavable Pendant Groups

The norbornene-based resin was synthesized similarly as described in Example 1.

(2) Method of Preparing Photosensitive Resin Composition

Ten grams of the thus-purified polymer #1 was weighed in a 100-mL glass container, and 40 g of mesitylene, 0.01 g of an antioxidant (Irganox 1076 from Ciba-Geigy Ltd.), 1.5 g of cyclohexyloxetane monomer (represented by formula 20, CHOX from TOAGOSEI Co., Ltd.), and $1.36 \times 10^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2 µm PTFE filter, thereby a clean photosensitive resin composition vanish V6 was obtained.

(3) Method of Manufacturing Optical Waveguide Film (Manufacturing of Lower Clad)

The lower clad similar to that described in Example 1 was manufactured.

(Formation of Core Regions and Cladding Regions)

The photosensitive resin composition vanish V6 was uniformly coated over the lower clad using a doctor blade, and kept in a drying oven at 45° C. for 15 minutes. After the solvent was completely removed, a photomask was pressed on the coated film, and the coated film was then selectively irradiated with ultraviolet radiation at 500 mJ/cm². The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

The upper clad similar to that described in Example 1 was manufactured.

(4) Evaluation

Evaluation was carried out similarly as described in Example 1. The propagation loss was calculated as 0.03 dB/cm. Difference in refractive index between the core regions and the cladding regions was found to be 0.01.

Example 7

(1) Synthesis of Norbornene-Based Resin Having Cleavable Pendant Groups

In a glove box conditioned to have both of moisture content and oxygen content suppressed to 1 ppm or smaller, and filled with dry nitrogen, 6.4 g (36.1 mmol) of hexylnorbornene (HxNB), 8.7 g (27.1 mmol) of diphenylmethylnorbornene methoxysilane (diPhNB), and 4.9 g (27.1 mmol) of epoxynorbornene (EpNB) were weighed in a 500-mL vial, the mixture was added with 60 g of dehydrated toluene and 11 g of ethyl acetate, and the vial was tightly closed by placing a sealer made of silicone resin.

Next, 1.75 g (3.2 mmol) of a Ni catalyst represented by chemical formula (B) in the above and 10 mL of dehydrated toluene were weighed in a 100-mL vial, a stirrer chip was placed therein, the vial was tightly closed, and the mixture was thoroughly stirred so as to extensively dissolve the catalyst.

One milliliter of the solution of the Ni catalyst represented by the chemical formula (B) was precisely measured using a syringe, and quantitatively injected in the vial containing three species of the above-described norbornene dissolved therein, and the mixture was stirred for one hour at room temperature. A distinctive increase in the viscosity was confirmed. The sealer was then removed, 60 g of tetrahydrofuran (THF) was added, the mixture was stirred, and thereby a reaction solution was obtained.

In a 100-mL beaker, 9.5 g of acetic anhydride, 18 g (30% concentration) of aqueous hydrogen peroxide solution, and 30 g of ion-exchanged water were placed, and the mixture was stirred so as to prepare an aqueous peroxyacetic acid solution in situ. Next, the whole volume of the aqueous solution was added to the above-described reaction solution, and the mixture was stirred for 12 hours so as to reduce Ni.

Next, the thus-processed reaction solution was transferred into a separating funnel, the lower aqueous layer was discarded, 100 mL of a 30% aqueous solution of isopropanol was added, and the content was vigorously shaken. The content was allowed to stand still, and the aqueous layer was discarded after complete two-layer separation was confirmed. The above-described water washing process was repeated three times in total, and an organic layer was dropped into a largely excessive amount of acetone to thereby re-precipitate the resultant polymer, the polymer was separated by filtration from the filtrate, and then dried in a vacuum desiccator set to 60° C. for 12 hours, and thereby a polymer #3 was obtained. The polymer was found to have a molecular weight distribution characterized by Mw=80,000 and Mn=40,000 based on GPC measurement. Molar ratio of the individual structural units in the polymer #3 was identified by NMR, thereby hexylnorbornene structural unit was found to account for 40 mol %, diphenylmethylnorbornene methoxysilane structural unit was found to account for 30 mol %, and epoxynorbornene structural unit was found to account for 30 mol %. The refractive index, measured using a Metricon's instrument, was found to be 1.53 (measured at 633 nm).

[Chemical Formula 47]

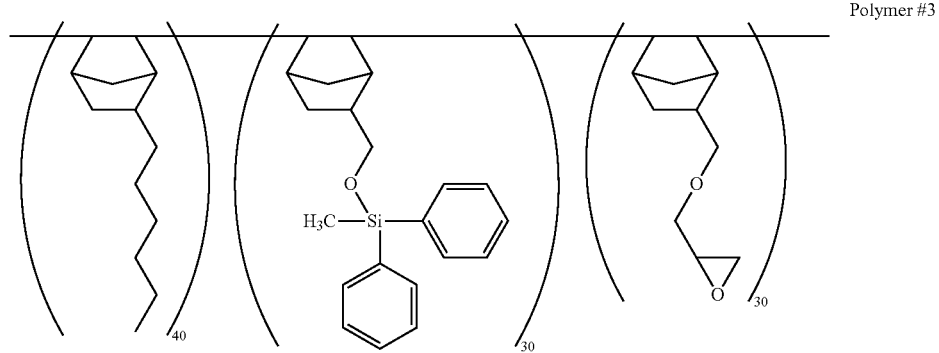

Polymer #3

(2) Method of Preparing Photosensitive Resin Composition

Ten grams of the thus-purified polymer #3 was weighed in a 100-mL glass container, and 40 g of mesitylene, 0.01 g of an antioxidant (Irganox 1076 from Ciba-Geigy Ltd.), 1.0 g of cyclohexyloxetane monomer (represented by the formula 20, CHOX from TOAGOSEI Co., Ltd.), and $1.36 \times 10^{-2}$ g of a photoacid generator (Rhodorsil Photoinitiator 2074, from Rhodia Inc., in 0.1 mL ethyl acetate) were added and allowed to uniformly dissolve. The mixture was filtered through a 0.2 µm PTFE filter, thereby a clean photosensitive resin composition vanish V7 was obtained.

(3) Method of Manufacturing Optical Waveguide Film (Manufacturing of Lower Clad)

The lower clad similar to that described in Example 1 was manufactured.

(Formation of Core Regions and Cladding Regions)

The photosensitive resin composition vanish V7 was uniformly coated over the lower clad using a doctor blade, and kept in a drying oven at 45° C. for 15 minutes. After the solvent was completely removed, a photomask was pressed on the coated film, and the coated film was then selectively irradiated with ultraviolet radiation at 500 mJ/cm². The mask was removed, and the coated film was heated in a drying oven in a three-step manner, firstly at 45° C. for 30 minutes, then at 85° C. for 30 minutes, and at 150° C. for one hour. After the heating, a very clear waveguide pattern was confirmed.

(Formation of Upper Clad)

The upper clad similar to that described in Example 1 was manufactured.

(4) Evaluation

Evaluation was carried out similarly as described in Example 1. The propagation loss was calculated as 0.04 dB/cm. Difference in refractive index between the core regions and the cladding regions was found to be 0.02.

TABLE 1

| | Polymer | Monomer | | Propagation loss [dB/cm] | Core/clad Difference in refractive index |
|---|---|---|---|---|---|
| | | Oxetane | Epoxy | | |
| Example 1 | 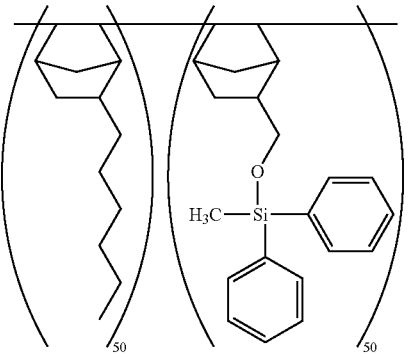 | CHOX (20 phr relative to polymer) | None | 0.03 | 0.02 |
| Example 2 | 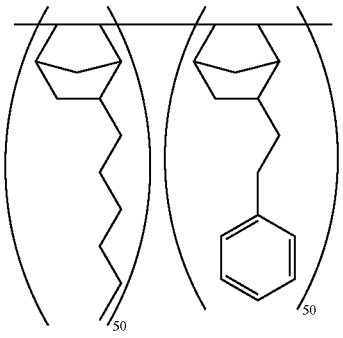 | CHOX 20 phr | None | 0.04 | 0.01 |
| Example 3 | Same as Example 1 | DOX 20 phr | None | 0.04 | 0.01 |
| Example 4 | Same as Example 1 | None | Alicyclic epoxy 20 phr | 0.04 | 0.01 |
| Example 5 | Same as Example 1 | CHOX 10 phr | Alicyclic epoxy 10 phr | 0.03 | 0.01 |
| Example 6 | Same as Example 1 | CHOX 15 phr | None | 0.03 | 0.01 |
| Example 7 | 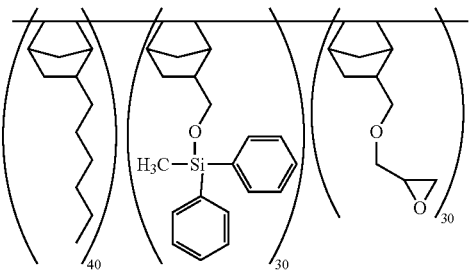 | CHOX 10 phr | None | 0.04 | 0.02 |

In Examples 1 to 7, upon irradiation of light onto the photosensitive resin composition, an acid generates from the photoacid generator, and thereby the monomer having the cyclic ether group polymerizes only in the irradiated area. Since the amount of unreacted monomer decreases in the irradiated area, the monomer in the unirradiated area diffuses towards the irradiated area, so as to cancel the concentration gradient which appeared between the irradiated area and the unirradiated area.

In addition, heating after the irradiation of light makes the monomer vaporize out from the unirradiated area.

As may be understood from the above, concentration of the monomer-derived structure becomes different between the core region and the cladding region, wherein the cladding region will have a larger amount of the monomer-derived structure having the cyclic ether group, whereas the core region will have a smaller amount of the monomer-derived structure having the cyclic ether group.

While the straight optical waveguides were formed in Examples 1 to 7, curved optical waveguides (with a radius of curvature of 10 mm or around) distinctively demonstrate lowered loss of light.

The optical waveguide films obtained in Examples 1 to 7 have levels of heat resistance, represented by a reflow resistance of 260° C. The optical waveguide films obtained in Examples 1 to 7 hardly causes degradation in the optical characteristics, such as yellowing, thermal degradation associated with coloration such as browning, and increased loss of light.

Comparison of Example 1 with Examples 3, 4 teaches that, by using CHOX (represented by formula 20 (formula 100)) as the monomer, the propagation loss may be reduced, and the core/clad difference in refractive index may be increased. It was also found that, by using CHOX (represented by formula 20 (formula 100)) as the monomer, the obtained optical waveguide films were found to have excellent flexibility.

Example 8

(1) Norbornene Resin Having Cleavable Pendant Groups

A norbornene-based resin having cleavable pendant groups was synthesized similarly as described in Example 1, except that 10.4 g (40.1 mmol) of phenyldimethylnorbornene methoxysilane was used in place of 12.9 g (40.1 mmol) of diphenylmethylnorbornene methoxysilane. GPC measurement of molecular weight the thus-obtained norbornene-based resin B (formula 103) having the cleavable pendant groups in the side chains thereof was represented by Mw=110,000 and Mn=50,000. Molar ratio of the individual structural units was identified by NMR, thereby hexylnorbornene structural unit was found to account for 50 mol %, and phenyldimethylnorbornene methoxysilane structural unit was found to account for 50 mol %. The refractive index, measured using a Metricon's instrument, was found to be 1.53 (measured at 633 nm).

(2) Method of Preparing Photosensitive Resin Composition

A photosensitive resin composition was obtained similarly as described in Example 1, except that the norbornene-based resin B was used in place of the polymer #1.

(3) Manufacturing of Optical Waveguide Film

An optical waveguide film was obtained similarly as described in Example 1, except that the photosensitive resin composition containing norbornene-based resin B was used.

Evaluation of loss in the optical waveguide, conducted similarly as described in Example 1, revealed that the propagation loss of the thus-obtained optical waveguide film was 0.03 dB/cm.

[Chemical Formula 48]

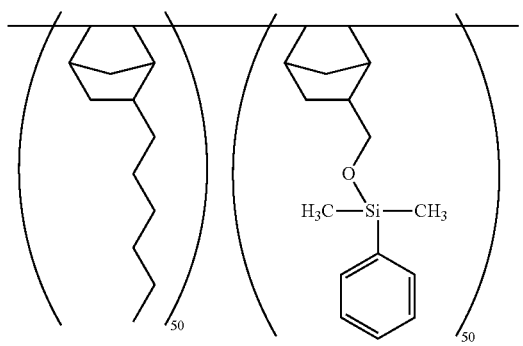

(103)

Example 9

(1) A Photosensitive Resin Composition was Synthesized Similarly as Described in Example 1, Except that the Materials Below were Used Ten grams of the norbornene-based resin obtained in Example 1 was weighed in a 100-mL glass container, and 40 g of mesitylene, 0.01 g of an antioxidant (Irganox 1076 from Ciba-Geigy Ltd.), 1 g of cyclohexyloxetane monomer (the first monomer represented by the formula (100), CHOX from TOAGOSEI Co., Ltd., CAS#483303-25-9, MW=186, b.p.=125° C./1.33 kPa), 1 g of bifunctional oxetane monomer (the second monomer represented by formula (104), DOX from TOAGOSEI Co., Ltd., CAS#18934-00-4, MW=214, b.p.=119° C./0.67 kPa), and $1.36 \times 10^{-2}$ g of a photoacid generator (Rhodorsil Photoinitiator 2074, from Rhodia Inc., CAS#178233-72-2, in 0.1 mL ethyl acetate) were added and allowed to uniformly dissolve. The mixture was filtered through a 0.2 μm PTFE filter, thereby a clean photosensitive resin composition vanish for forming the core layer was prepared.

(2) Manufacturing of Optical Waveguide Film

An optical waveguide film was obtained similarly as described in Example 1, except that the photosensitive resin composition (1) was used.

Evaluation of loss in the optical waveguide, conducted similarly as described in Example 1, revealed that the propagation loss of the thus-obtained optical waveguide film was 0.04 dB/cm.

[Chemical Formula 49]

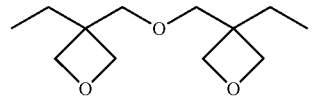

(104)

Example 10

Processes were same as described in Example 1, except that the materials below were used as the cyclic olefin.

(1) Synthesis of Norbornene-Based Resin C

Ring-opening metathesis polymerization of phenylethylnorbornene (PENB) monomer was conducted according to a publicly-known technique (see Japanese Laid-Open Patent Publication No. 2003-252963, for example), and thereby a norbornene-based resin C having a repeating unit represented by the formula (105) below was obtained.

(2) Manufacturing of Photosensitive Resin Composition

A photosensitive resin composition was obtained similarly as descried in Example 1, except that the norbornene-based resin C was used in place of the polymer #1.

(3) Manufacturing of Optical Waveguide Film

An optical waveguide film was obtained similarly as described in Example 1, except that the photosensitive resin composition containing the norbornene-based resin C was used.

Evaluation of loss in the optical waveguide, conducted similarly as described in Example 1, revealed that the propagation loss of the thus-obtained optical waveguide film was 0.05 dB/cm.

[Chemical Formula 50]

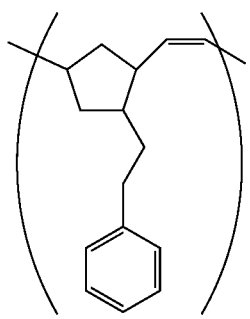

(105)

Example 11

An optical waveguide film was manufactured similarly as described in Example 1, except that the amount of use of the first monomer was set to 0.5 g.

The propagation loss of the thus-obtained optical waveguide film was found to be 0.1 dB/cm.

Example 12

An optical waveguide film was manufactured similarly as described in Example 1, except that the amount of use of the first monomer was set to 4.0 g.

The propagation loss of the thus-obtained optical waveguide film was found to be 0.1 dB/cm.

Example 13

An optical waveguide film was manufactured similarly as described in Example 1, except that the amount of use of the first monomer was set to 0.1 g.

The propagation loss of the thus-obtained optical waveguide film was found to be 0.12 dB/cm.

Example 14

An optical waveguide film was manufactured similarly as described in Example 1, except that the amount of use of the first monomer was set to 5.0 g.

The propagation loss of the thus-obtained optical waveguide film was found to be 0.13 dB/cm.

Example 15

An optical waveguide film was manufactured similarly as described in Example 9, except that the amount of use of the first monomer CHOX was set to 1 g, and the amount of used of the second monomer DOX was set to 0.1 g.

The propagation loss of the thus-obtained optical waveguide film was found to be 0.05 dB/cm.

Comparative Example 1

An optical waveguide film was manufactured similarly as described in Example 1, except that the first monomer was not used.

The propagation loss of the thus-obtained optical waveguide film was found to be 0.90 dB/cm.

The optical waveguides obtained in the individual Examples and Comparative Example were evaluated as described below. Items to be evaluated and details will be given below. Results are shown in Table 2.

1. Loss of Light

Light emitted from a 850-nm VCSEL (surface emitting laser) was introduced through a 50-μm-diameter optical fiber into each of the optical waveguides, and intensity of light received by a 200-μm-diameter optical fiber was measured. The cutback method is adopted to this measurement. When plotted with the length of waveguide on the abscissa and the insertion loss on the ordinate, the measured values were found to clearly fall on a straight line. Propagation loss was calculated from the slope.

2. Heat Resistance

The optical waveguides were placed in a high-temperature-high-humidity chamber (85° C., 85% RH) for wet-thermal treatment for 500 hours, and propagation loss was evaluated. Degradation of propagation loss was confirmed also after reflow process (in a $N_2$ environment, at a maximum temperature of 260° C. for 60 seconds).

The propagation loss herein was measured similarly as described in "1. Loss of Light" in the above.

3. Bending Loss of Optical Waveguide

Figure 4:
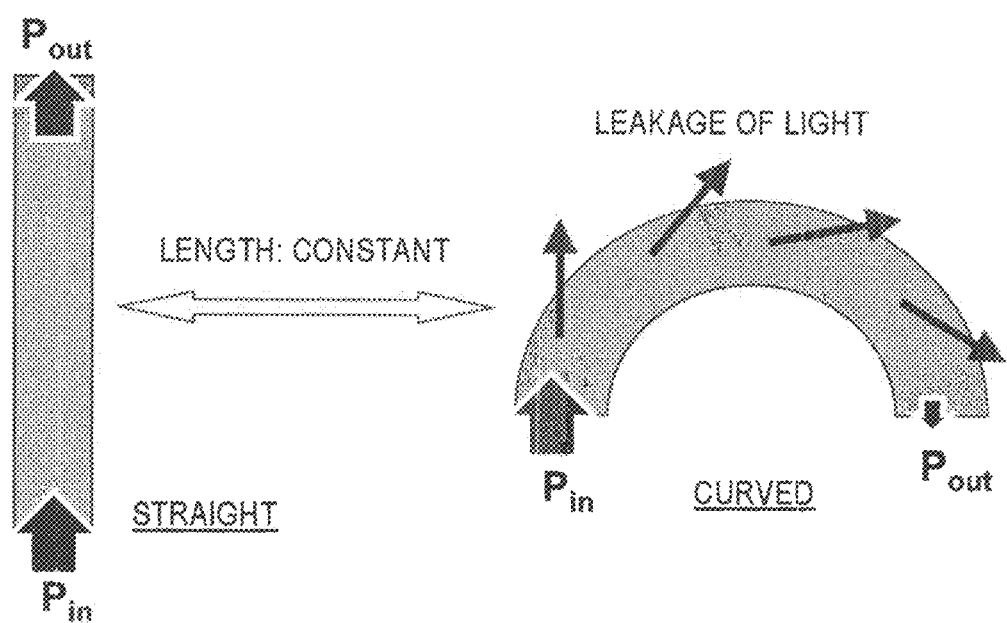
FIG. 4 is a drawing illustrating a method of measuring bending loss in Examples.

Bending loss of intensity of light of the optical waveguide film illustrated in FIG. 3, bent at a radius of curvature of 10 mm, was evaluated. Light emitted from a 850-nm VCSEL (surface emitting laser) was introduced through a 50-μm-diameter optical fiber into one end face of each optical waveguide film, and intensity of light received by a 200-μm-diameter optical fiber placed at the opposite end face was measured (see the equation below). "Bending loss" is now defined as an increment of loss observed when the same length of optical waveguide film is bent. More specifically, the "bending loss" was given by a difference between the insertion loss observed when the optical waveguide film is bent, and the insertion loss observed when the optical waveguide film is kept straight, as illustrated in FIG. 4.

Insertion loss [dB]=−10 log(intensity of output light/intensity of input light)

Bending loss=(insertion loss in bent form)−(insertion loss in straight form)

TABLE 2

| | Polymer | Monomer | Loss of light [dB/cm] | Bending loss [dB/cm] | Evaluation of heat resistance 85° C. 85% RH 500 hr | Evaluation of heat resistance 260° C. Retlow |
|---|---|---|---|---|---|---|
| Example 1 | (structure with norbornene units, H₃C—Si(—O—CH₂—norbornyl)(—phenyl)(—phenyl), 50/50) | CHOX (20 parts by weight per 100 parts by weight of polymer) | 0.03 | 0.7 | 0.05 | 0.04 |
| Example 8 | (structure with norbornene units, H₃C—Si(—CH₃)(—O—CH₂—norbornyl)(—phenyl), 50/50) | CHOX | 0.03 | 0.8 | 0.05 | 0.05 |
| Example 9 | Same as Example 1 | CHOX DOX (Ratio "2nd monomer/1st monomer" = 1) | 0.04 | 0.9 | 0.04 | 0.05 |
| Example 10 | (cyclopentane-based structure with phenethyl and vinyl substituents) | CHOX | 0.05 | 0.9 | 0.10 | 0.36 |
| Example 11 | Same as Example 1 | CHOX (5 parts by weight per 100 parts by weight of polymer) | 0.10 | 1.2 | 0.11 | 0.11 |
| Example 12 | Same as Example 1 | CHOX (40 parts by weight per 100 parts by weight of polymer) | 0.10 | 1.1 | 0.12 | 0.11 |
| Example 13 | Same as Example 1 | CHOX (1 parts by weight per 100 parts by weight of polymer) | 0.12 | 1.5 | 0.13 | 0.20 |

TABLE 2-continued

| | Polymer | Monomer | Loss of light [dB/cm] | Bending loss [dB/cm] | Evaluation of heat resistance 85° C. 85% RH 500 hr | 260° C. Retlow |
|---|---|---|---|---|---|---|
| Example 14 | Same as Example 1 | CHOX (50 parts by weight per 100 parts by weight of polymer) | 0.13 | 2.0 | 0.14 | 0.21 |
| Example 15 | Same as Example 1 | CHOX DOX (Ratio "2nd monomer/1st monomer" = 0.1) | 0.05 | 0.9 | 0.08 | 0.08 |
| Comparative Example 11 | Same as Example 1 | None | 0.90 | 2.5 | 0.99 | 1.12 |

As may clearly be understood from Table 2, Examples 1 and 8-15 were found to show small loss of light, proving excellent performance of the optical waveguides.

Examples 1 and 8-15 were also found to cause only small loss of light after high-temperature-high-humidity treatment and reflow process, proving excellence also in the heat resistance.

In particular, Examples 1, 8, 9, 10 and 15 were also found to cause small bending loss, suggesting sufficient levels of performance of the optical waveguides even if used in a bent form.

Comparison among Examples 1, 11, 12, 13 and 14 teaches that the amount of use of CHOX adjusted to 5 to 40 parts by weight per 100 parts by weight of polymer gave particularly good results.

In addition, Example 9 using the first monomer and the second monomer in combination was found to give only a small degradation of loss of light after the wet-thermal treatment at 85° C., 85% RH for 500 hours, as compared with the loss of light before the wet-thermal treatment, proving a large advantage of heat resistance over Example 1 using the first monomer only.

The invention claimed is:

1. A photosensitive resin composition, comprising:
   (A) a cyclic olefin resin;
   (B) at least one selected from the group consisting of a monomer comprising a cyclic ether group and an oligomer comprising a cyclic ether group, having a refractive index different from that of the component (A); and
   (C) a photoacid generator,
   wherein the component (B) comprises at least one selected from the group consisting of a monomer or oligomer, wherein the cyclic ether group is an oxetanyl group,
   wherein the amount of the component (B) is 1 part by weight or more, and 50 parts by weight or less per 100 parts by weight of the component (A).

2. The composition of claim 1,
   wherein the component (A) is a norbornene resin, comprising norbornene in reacted form.

3. The composition of claim 1,
   wherein the component (B) has a refractive index lower than that of the component (A),
   the cyclic olefin resin (A) comprises a cleavable pendant group which eliminates in the presence of an acid released from the photoacid generator (C), and makes the resultant resin (A) lowered in the refractive index by elimination.

4. The composition of claim 1,
   wherein the cyclic olefin resin (A) comprises, in side chain thereof, a cleavable pendant group which eliminates in the presence of an acid released from the photoacid generator (C), and
   the component (B) comprises a first monomer represented by formula (100):

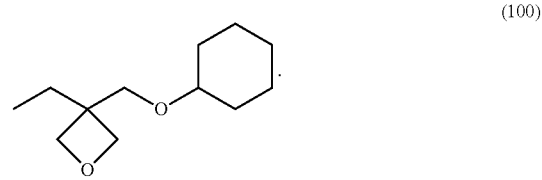

(100)

5. The composition of claim 4,
   wherein the component (B) further comprises at least one further monomer selected from the group consisting of an epoxy compound and an oxetane compound comprising two oxetanyl groups.

6. The composition of claim 4,
   wherein the cyclic olefin resin (A) is a norbornene resin, comprising norbornene in reacted form.

7. The composition of claim 6,
   wherein the norbornene resin is an addition polymer of norbornene comprising a repeating unit of formula (101):

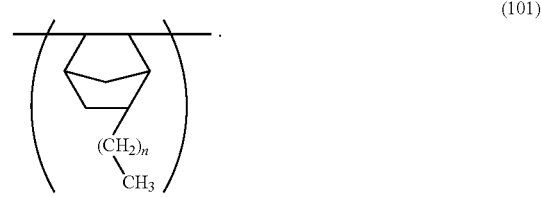

(101)

wherein n represents an integer of 0 or larger, and 9 or smaller.

8. The composition of claim 6,
   wherein the norbornene resin is an addition polymer of norbornene comprising a repeating unit of formula (102):

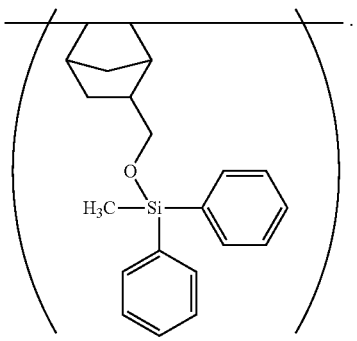

(102)

9. The composition of claim 5,
wherein a ratio by weight of the further monomer and the first monomer, weight of further monomer/weight of first monomer, is 0.1 to 1.0.

10. A film, comprising the composition of claim 1, produced in the form of film,
wherein the film is suitable to form an optical waveguide.

11. An optical waveguide film, formed by irradiating the film of claim 10 with light, so as to make an irradiated area as either one of a cladding region and a core region, and an unirradiated area as a residual part of the cladding region and the core region.

12. An optical interconnect, comprising the optical waveguide film of claim 11.

13. An opto-electric hybrid circuit board, comprising:
at least one electric interconnect; and
the optical interconnect of claim 12.

14. An electronic device, comprising the optical waveguide film of claim 11.

15. A method of manufacturing an optical waveguide film, comprising:
selectively irradiating the composition of claim 1 with light, to obtain an irradiated composition; and
heating the irradiated composition,
so as to make an irradiated area as either one of a cladding region and a core region, and an unirradiated area as the residual part of the cladding region and the core region.

16. The photosensitive resin composition according to claim 1, the amount of the component (C) is 0.01 parts by weight or more, and 0.3 parts by weight or less per 100 parts by weight of the component (A).

* * * * *